(12) United States Patent

Fry et al.

(10) Patent No.: US 12,582,933 B2

(45) Date of Patent: *Mar. 24, 2026

(54) POWER TOOL INCLUDING AN AIR FILTER AND DEBRIS COLLECTOR

(71) Applicant: MILWAUKEE ELECTRIC TOOL CORPORATION, Brookfield, WI (US)

(72) Inventors: Paul Fry, Pewaukee, WI (US); Thomas G. Simeone, Milwaukee, WI (US); Robert Patrick Warren, Charlotte, NC (US); Roderick Burgess, Charlotte, NC (US); Joseph M. Lehman, New Albany, OH (US); Garry Fee, Huntersville, NC (US); Michael Bloom, Charlotte, NC (US); William Jacob Kozlowski, Jr., Waxhaw, NC (US); Steven Marcus, Charlotte, NC (US); Scott T. Moeller, Richfield, WI (US); John S. Scott, Brookfield, WI (US); Samuel A. Gould, Wauwatosa, WI (US); Bennett W. Westling, Milwaukee, WI (US); Christopher S. Hoppe, Milwaukee, WI (US); Benjamin T. Jones, St. Francis, WI (US); Michael A. Verhagen, Nashotah, WI (US); Kyle Reeder, Waukesha, WI (US); Jonathan Lowry, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,532

(22) Filed: Mar. 20, 2023

(65) Prior Publication Data

US 2023/0219028 A1 Jul. 13, 2023

Related U.S. Application Data

(63) Continuation of application No. 16/552,232, filed on Aug. 27, 2019, now Pat. No. 11,607,637.

(Continued)

(51) Int. Cl.
*B01D 46/42* (2006.01)
*A47L 5/24* (2006.01)
(Continued)

(52) U.S. Cl.
CPC ............ *B01D 46/4272* (2013.01); *A47L 5/24* (2013.01); *A47L 9/102* (2013.01); *A47L 9/1454* (2013.01);
(Continued)

(58) Field of Classification Search
None
See application file for complete search history.

(56) References Cited

U.S. PATENT DOCUMENTS 2,295,984 A    9/1942   Wilson
2,564,467 A  *  8/1951   Cranmer ............... A47L 9/1427
                                                        220/348

(Continued)

FOREIGN PATENT DOCUMENTS

AU        2011265411        7/2012
CH           408311        2/1966
(Continued)

OTHER PUBLICATIONS

KR20180046259A_ENG (Espacenet machine translation of Cho) (Year: 2018).*

(Continued)

*Primary Examiner* — Gabriel E Gitman

(74) *Attorney, Agent, or Firm* — Michael Best & Friedrich LLP

(57) ABSTRACT

A power tool having a power tool housing, a motor, a tool moved relative to the housing by the motor, a fan rotated by
(Continued)

the motor such that a fluid flow with debris generated by tool is moved into the fluid inlet by the fan and through the discharge outlet, and a filter that is removably attached to the power tool housing. The power tool housing includes a fluid inlet and a discharge outlet. The filter includes a filter media for separating the debris from the flow of fluid. The filter media defines a collection container for storing the debris. The filter also includes an opening through which the flow of fluid with the debris enters the collection container, and a valve that is moveable between a closed position, in which the opening is closed, and an open position, in which the opening is open. The valve includes a duckbill check valve.

10 Claims, 31 Drawing Sheets

Related U.S. Application Data

(60) Provisional application No. 62/744,769, filed on Oct. 12, 2018, provisional application No. 62/725,899, filed on Aug. 31, 2018.

(51) Int. Cl.

| | |
|---|---|
| *A47L 9/10* | (2006.01) |
| *A47L 9/14* | (2006.01) |
| *A47L 9/16* | (2006.01) |
| *B01D 46/00* | (2022.01) |
| *B01D 46/02* | (2006.01) |
| *B01D 46/52* | (2006.01) |
| *B23B 47/34* | (2006.01) |
| *B23D 59/00* | (2006.01) |
| *B23Q 11/00* | (2006.01) |
| *B24B 55/10* | (2006.01) |
| *B65D 33/25* | (2006.01) |

(52) U.S. Cl.

CPC ........... *A47L 9/1472* (2013.01); *A47L 9/1683* (2013.01); *B01D 46/0002* (2013.01); *B01D 46/0043* (2013.01); *B01D 46/02* (2013.01); *B01D 46/521* (2013.01); *B23B 47/34* (2013.01); *B23D 59/006* (2013.01); *B23Q 11/0071* (2013.01); *B24B 55/10* (2013.01); *B24B 55/102* (2013.01); *B65D 33/2589* (2020.05); *B01D 2275/203* (2013.01); *B01D 2279/00* (2013.01); *B23Q 11/0046* (2013.01)

(56) References Cited

U.S. PATENT DOCUMENTS

| | | | | |
|---|---|---|---|---|
| 2,615,531 | A | 10/1952 | Allen | |
| 2,729,303 | A | 1/1956 | McMahan | |
| 3,568,412 | A * | 3/1971 | Schwab | B01D 46/02 |
| | | | | 91/1 |
| 3,998,656 | A | 12/1976 | Grotto | |
| 4,073,632 | A | 2/1978 | Reinauer et al. | |
| 4,276,069 | A | 6/1981 | Miller | |
| 4,391,274 | A * | 7/1983 | Kagan | A61M 5/165 |
| | | | | 604/247 |
| D277,516 | S | 2/1985 | Hayden et al. | |
| D304,250 | S | 10/1989 | Hassel et al. | |
| 4,947,512 | A | 8/1990 | Lackner et al. | |
| 4,961,765 | A * | 10/1990 | Guhne | A47L 9/1436 |
| | | | | 55/374 |
| 5,107,567 | A | 4/1992 | Ferrari et al. | |
| 5,467,835 | A | 11/1995 | Obermeier et al. | |
| 6,029,309 | A | 2/2000 | Imamura | |
| 6,047,693 | A | 4/2000 | Yamami et al. | |
| 6,058,560 | A | 5/2000 | Gab et al. | |
| 6,237,648 | B1 | 5/2001 | Busacca et al. | |

| | | | | |
|---|---|---|---|---|
| 6,256,834 | B1 | 7/2001 | Meijer et al. | |
| D449,138 | S | 10/2001 | Dodson et al. | |
| 6,514,131 | B1 * | 2/2003 | Reich | B23Q 11/0046 |
| | | | | 451/344 |
| 6,571,422 | B1 | 6/2003 | Gordon et al. | |
| 6,830,507 | B2 * | 12/2004 | Reich | B24B 23/00 |
| | | | | 451/356 |
| 6,871,679 | B2 | 3/2005 | Last | |
| 7,143,467 | B2 | 12/2006 | Seith | |
| D544,347 | S | 6/2007 | Last | |
| 7,237,298 | B2 | 7/2007 | Reindle et al. | |
| 7,254,865 | B2 | 8/2007 | Bosses | |
| D551,078 | S | 9/2007 | Last | |
| 7,310,854 | B2 | 12/2007 | Nam et al. | |
| 7,325,272 | B2 | 2/2008 | Bosses | |
| 7,424,766 | B2 | 9/2008 | Reindle et al. | |
| 7,468,083 | B2 | 12/2008 | Davis et al. | |
| 7,509,707 | B2 | 3/2009 | Pullins | |
| 7,599,758 | B2 | 10/2009 | Reindle et al. | |
| 7,673,368 | B2 | 3/2010 | Cloud, III | |
| 7,770,253 | B2 | 8/2010 | Ha et al. | |
| 7,785,396 | B2 | 8/2010 | Hwang et al. | |
| 7,823,249 | B2 | 11/2010 | Zahuranec et al. | |
| D635,728 | S | 4/2011 | Fjellman | |
| 7,958,598 | B2 | 6/2011 | Yun et al. | |
| 7,998,234 | B2 | 8/2011 | Hwang et al. | |
| 8,012,250 | B2 | 9/2011 | Hwang et al. | |
| 8,021,452 | B2 | 9/2011 | Hwang et al. | |
| 8,043,397 | B2 | 10/2011 | Hwang et al. | |
| 8,043,410 | B2 | 10/2011 | Hwang et al. | |
| 8,060,979 | B2 | 11/2011 | Hwang et al. | |
| 8,092,562 | B2 | 1/2012 | Sauer et al. | |
| 8,099,825 | B2 | 1/2012 | Zahuranec et al. | |
| 8,240,001 | B2 | 8/2012 | Hwang et al. | |
| D668,824 | S | 10/2012 | Miers | |
| 8,286,299 | B2 | 10/2012 | Williams et al. | |
| 8,302,250 | B2 | 11/2012 | Dyson et al. | |
| 8,312,593 | B2 | 11/2012 | Hwang et al. | |
| 8,404,034 | B2 | 3/2013 | Hwang et al. | |
| D682,694 | S | 5/2013 | van den Hoonaard | |
| 8,449,639 | B2 | 5/2013 | Sauer et al. | |
| 8,460,256 | B2 | 6/2013 | Michaels et al. | |
| D687,719 | S | 8/2013 | Last | |
| 8,661,610 | B2 | 3/2014 | Lui et al. | |
| D703,890 | S | 4/2014 | Shin et al. | |
| 8,689,398 | B2 | 4/2014 | Chung et al. | |
| D704,058 | S | 5/2014 | Last | |
| D704,556 | S | 5/2014 | van den Hoonaard | |
| 8,726,457 | B2 | 5/2014 | Liu et al. | |
| 8,726,459 | B2 | 5/2014 | Yun et al. | |
| 8,794,488 | B2 | 8/2014 | van der Molen | |
| 8,806,705 | B2 | 8/2014 | Minor et al. | |
| 8,893,912 | B2 | 11/2014 | van der Molen et al. | |
| 8,916,002 | B1 | 12/2014 | Landolt | |
| 8,939,302 | B2 | 1/2015 | Last et al. | |
| 8,950,939 | B2 | 2/2015 | Last et al. | |
| 9,015,897 | B2 | 4/2015 | Jonsson et al. | |
| D731,136 | S | 6/2015 | Yun et al. | |
| D731,720 | S | 6/2015 | Gidwell et al. | |
| D731,724 | S | 6/2015 | Cheon et al. | |
| 9,113,764 | B2 | 8/2015 | Theising | |
| D738,584 | S | 9/2015 | Niedzwecki | |
| 9,138,113 | B2 | 9/2015 | Nesom et al. | |
| 9,145,237 | B2 | 9/2015 | Van Der Molen | |
| D742,083 | S | 10/2015 | Gidwell et al. | |
| 9,232,879 | B2 | 1/2016 | Schultink et al. | |
| D770,111 | S | 10/2016 | Lee et al. | |
| D771,890 | S | 11/2016 | Kim | |
| D772,512 | S | 11/2016 | Yoon et al. | |
| D774,260 | S | 12/2016 | Manning | |
| D775,772 | S | 1/2017 | Lee et al. | |
| D792,665 | S | 7/2017 | Salagnac | |
| D798,009 | S | 9/2017 | Salagnac | |
| D799,767 | S | 10/2017 | Palladino et al. | |
| D800,977 | S | 10/2017 | Dammkoehler et al. | |
| D800,978 | S | 10/2017 | Dammkoehler et al. | |
| D800,980 | S | 10/2017 | Carter et al. | |
| D804,114 | S | 11/2017 | Kim et al. | |
| 10,743,731 | B2 | 8/2020 | Warren et al. | |

(56) References Cited

U.S. PATENT DOCUMENTS

| | | | | |
|---|---|---|---|---|
| 11,607,637 B2 * | 3/2023 | Fry | A47L 9/1683 | |
| 2001/0047721 A1 * | 12/2001 | Scanlon | B01D 46/48 | |
| | | | 55/369 | |
| 2004/0247407 A1 | 12/2004 | Tillemans et al. | | |
| 2004/0250887 A1 | 12/2004 | Thomas | | |
| 2005/0091784 A1 | 5/2005 | Bone | | |
| 2005/0183230 A1 | 8/2005 | Uehigashi | | |
| 2005/0273968 A1 | 12/2005 | Seith | | |
| 2006/0178087 A1 * | 8/2006 | Wuensch | B24B 55/10 | |
| | | | 451/344 | |
| 2006/0242787 A1 | 11/2006 | Bosses | | |
| 2006/0276116 A1 * | 12/2006 | Reich | B24B 55/10 | |
| | | | 15/339 | |
| 2007/0214597 A1 | 9/2007 | Suzuki | | |
| 2008/0134461 A1 | 6/2008 | Hedelund Nielsen | | |
| 2009/0139047 A1 * | 6/2009 | Williams | B23D 59/006 | |
| | | | 15/301 | |
| 2009/0139048 A1 | 6/2009 | Williams | | |
| 2009/0236900 A1 | 9/2009 | Due et al. | | |
| 2009/0241285 A1 | 10/2009 | Hinklin et al. | | |
| 2009/0313783 A1 * | 12/2009 | Nakano | A47L 9/1608 | |
| | | | 15/353 | |
| 2010/0230410 A1 | 9/2010 | Last et al. | | |
| 2010/0293742 A1 | 11/2010 | Chung et al. | | |
| 2011/0232687 A1 | 9/2011 | Stein | | |
| 2012/0151710 A1 | 6/2012 | Yarbrough | | |
| 2012/0152280 A1 | 6/2012 | Bosses et al. | | |
| 2012/0261441 A1 | 10/2012 | van den Hoonaard | | |
| 2012/0267891 A1 | 10/2012 | Walz et al. | | |
| 2013/0185892 A1 | 7/2013 | Walker | | |
| 2013/0199662 A1 | 8/2013 | Gebbink et al. | | |
| 2014/0144865 A1 | 5/2014 | Last | | |
| 2016/0051109 A1 | 2/2016 | Hwang et al. | | |
| 2017/0000305 A1 | 1/2017 | Gordon et al. | | |
| 2017/0258282 A1 | 9/2017 | Shinagawa | | |
| 2017/0355053 A1 | 12/2017 | Furusawa et al. | | |

FOREIGN PATENT DOCUMENTS

| | | |
|---|---|---|
| CN | 1090469 | 9/2002 |
| CN | 2527215 | 12/2002 |
| CN | 2528381 | 1/2003 |
| CN | 1463669 | 12/2003 |
| CN | 100382739 | 3/2005 |
| CN | 1765306 | 5/2006 |
| CN | 1951295 | 4/2007 |
| CN | 1954754 | 5/2007 |
| CN | 1954766 | 5/2007 |
| CN | 1973749 | 6/2007 |
| CN | 201015573 | 2/2008 |
| CN | 100374062 | 3/2008 |
| CN | 101229029 | 7/2008 |
| CN | 201153911 | 11/2008 |
| CN | 101313832 | 12/2008 |
| CN | 201167925 | 12/2008 |
| CN | 100450412 | 1/2009 |
| CN | 101387876 | 3/2009 |
| CN | 101558970 | 10/2009 |
| CN | 101558976 | 10/2009 |
| CN | 100571593 | 12/2009 |
| CN | 101596086 | 12/2009 |
| CN | 101612016 | 12/2009 |
| CN | 101756674 | 6/2010 |
| CN | 101822508 | 9/2010 |
| CN | 101945607 | 1/2011 |
| CN | 101953666 | 1/2011 |
| CN | 201734660 | 2/2011 |
| CN | 102068220 | 5/2011 |
| CN | 102256524 | 11/2011 |
| CN | 102599857 | 7/2012 |
| CN | 202288130 | 7/2012 |
| CN | 202526083 | 11/2012 |
| CN | 103037746 | 4/2013 |
| CN | 202932857 | 5/2013 |
| CN | 203138359 | 8/2013 |
| CN | 203302992 | 11/2013 |
| CN | 203314892 | 12/2013 |
| CN | 103874446 | 6/2014 |
| CN | 203861136 | 10/2014 |
| CN | 203861137 | 10/2014 |
| CN | 203885442 | 10/2014 |
| CN | 203914785 | 11/2014 |
| CN | 204192519 | 3/2015 |
| CN | 204274321 | 4/2015 |
| CN | 205092625 | 3/2016 |
| CN | 105496311 | 4/2016 |
| CN | 105496312 | 4/2016 |
| CN | 205162973 | 4/2016 |
| CN | 205162975 | 4/2016 |
| CN | 105534412 | 5/2016 |
| CN | 105581731 | 5/2016 |
| CN | 105595920 | 5/2016 |
| CN | 105640438 | 6/2016 |
| CN | 205458450 | 8/2016 |
| CN | 205514398 | 8/2016 |
| CN | 205514399 | 8/2016 |
| CN | 205514400 | 8/2016 |
| CN | 205514401 | 8/2016 |
| CN | 205649469 | 10/2016 |
| CN | 106175594 | 12/2016 |
| CN | 104224049 | 12/2024 |
| DE | 10055926 | 5/2002 |
| DE | 102007036157 | 2/2009 |
| DE | 202008002310 | 6/2009 |
| DE | 102008010068 | 8/2009 |
| DE | 102008038893 | 2/2010 |
| DE | 102009035717 | 2/2011 |
| DE | 102011006542 | 10/2012 |
| DE | 102011052023 | 1/2013 |
| DE | 202011052208 | 3/2013 |
| DE | 202013100862 | 3/2013 |
| DE | 202013103508 | 8/2013 |
| DE | 102014002743 | 9/2014 |
| DE | 102014109596 | 2/2015 |
| DE | 202015101218 | 4/2015 |
| DE | 202014100563 | 5/2015 |
| DE | 102014209925 | 11/2015 |
| DE | 102015108462 | 12/2016 |
| EP | 1836941 | 9/2007 |
| EP | 1894507 | 3/2008 |
| EP | 1480545 | 4/2008 |
| EP | 1318746 | 9/2009 |
| EP | 2380477 | 10/2011 |
| EP | 2417887 A1 * | 2/2012 | A47L 9/14 |
| EP | 2249688 | 5/2013 |
| EP | 2378940 | 5/2013 |
| EP | 1933685 | 3/2014 |
| EP | 2732747 | 5/2014 |
| EP | 2772173 | 9/2014 |
| EP | 2820991 | 1/2015 |
| GB | 879781 | 10/1961 |
| GB | 2407257 | 4/2005 |
| GB | 2441962 | 3/2008 |
| JP | 2005335060 | 12/2005 |
| JP | 2010064199 | 3/2010 |
| KR | 20180046259 A * | 5/2018 |
| WO | WO2007033977 | 3/2007 |
| WO | WO2009011482 | 1/2009 |
| WO | WO2016096045 | 1/2016 |
| WO | WO2016206732 | 12/2016 |

OTHER PUBLICATIONS

International Search Report and Written Opinion for Application No. PCT/US2017/027684 dated Aug. 22, 2017 (19 pages).

Dirt Devil Hand Vac Owner's Manual for Model No. 1-500181-001, 1995, (8 pages).

International Invitation To Pay Additional Fees and Partial International Search for Application No. PCT/US2017/027671 dated Oct. 2, 2017 (15 pages).

International Search Report and Written Opinion for Application No. PCT/US2014/027671 dated Nov. 30, 2017. 22 pages.

(56)             References Cited

OTHER PUBLICATIONS

International Search Report and Written Opinion for Application
No. PCT/US2019/048287 dated Dec. 13, 2019 (10 pages).

* cited by examiner

POWER TOOL INCLUDING AN AIR FILTER AND DEBRIS COLLECTOR

CROSS-REFERENCE TO RELATED APPLICATIONS

This application is a continuation of U.S. patent application Ser. No. 16/552,232 filed on Aug. 27, 2019, now U.S. Pat. No. 11,607,637 which claims priority to U.S. Provisional Patent Application No. 62/744,769 filed on Oct. 12, 2018, and U.S. Provisional Patent Application No. 62/725,899 filed on Aug. 31, 2018, the entire contents of all of which are incorporated herein by reference.

FIELD OF THE INVENTION

The present invention relates to power tools, and more particularly to power tools including an air filter and debris collector.

BACKGROUND OF THE INVENTION

During operation of a power tool, debris is generated and operators use filters or vacuums to clean and store the debris.

SUMMARY OF THE INVENTION

The present disclosure provides, in one aspect, a power tool including a power tool housing. The power tool housing includes a fluid inlet and a discharge outlet. The power tool also includes a motor, a tool moved relative to the housing by the motor, a fan rotated by the motor such that a fluid flow with debris generated by tool is moved into the fluid inlet by the fan and through the discharge outlet, and a filter that is removably attached to the power tool housing. The filter includes a filter media configured to separate the debris from the flow of fluid, the filter media defining a collection container configured to store the debris. The filter also includes an opening through which the flow of fluid with the debris enters the collection container, and a valve that is moveable between a closed position, in which the opening is closed, and an open position, in which the opening is open. The valve includes a duckbill check valve.

The present disclosure provides, in another aspect, a power tool including power tool housing. The power tool housing includes a fluid inlet and a discharge outlet. The power tool also includes a motor, a tool moved relative to the housing by the motor, a fan rotated by the motor such that a fluid flow with debris generated by tool is moved into the fluid inlet by the fan and through the discharge outlet, and a filter that is removably attached to the power tool housing. The filter includes a filter media configured to separate the debris from the flow of fluid, the filter media defining a collection container configured to store the debris. The filter also includes an opening through which the flow of fluid with the debris enters the collection container, and a valve that is moveable between a closed position, in which the opening is closed, and an open position, in which the opening is open. The valve includes a zipper.

The present invention provides, in yet another aspect, power tool including a power tool housing, a motor, and a tool coupled to the motor. The tool is movable relative to the power tool housing by the motor. The power tool also includes a filter configured to store debris generated by the tool from a workpiece. The filter including an inlet opening. The power tool also includes an inlet on the power tool housing configured to receive a flow of fluid with the debris, and a fan in fluid communication with the inlet and the inlet opening of the filter. The fan is configured to be rotated by the motor, such that rotation of the fan causes the flow of fluid with the debris to move through the inlet on the power tool housing and into the inlet opening of the filter. The filter is fluidly arranged between the fan and the inlet on the power tool housing, such that the flow of fluid is substantially free of the debris when it passes through the fan.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
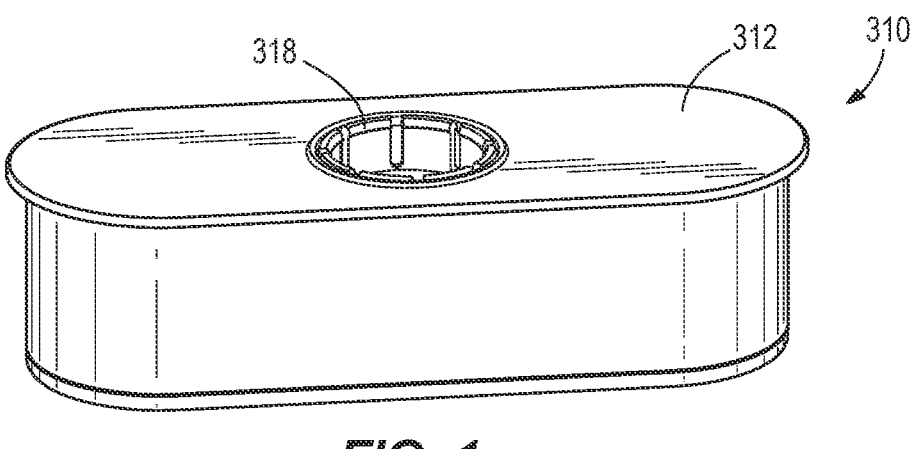
FIG. 1 is a perspective view of a filter in a collapsed position according to an embodiment of the invention.
Figure 2:
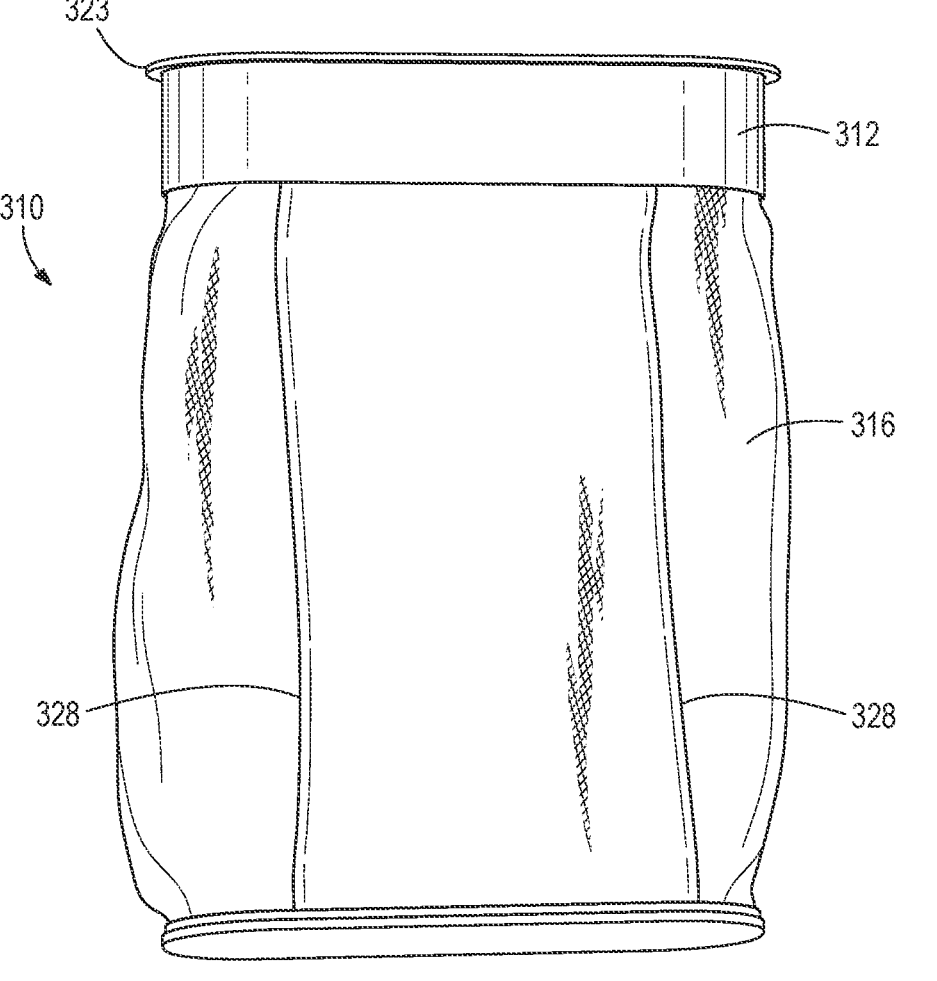
FIG. 2 is a perspective view of the filter of FIG. 1 in an expanded position.

FIGS. 1 and 2 illustrate a filter and debris collector 310 that can be used with the power tools illustrated in FIGS. 28-32. The filter and debris collector 310 is not limited to use with only the power tools illustrated in FIGS. 28-32, as will be discussed below. Also, the following disclosure describes several alternative embodiments of the filter 310, and any of these alternative embodiments could be used in the power tools of FIGS. 28-32 as well as other types of power tools.

The filter 310 can move between a collapsed position (FIG. 1) and an expanded position (FIG. 2). The filter 310 may be supplied to the consumer in the collapsed position. Then, in one embodiment, the filter 310 is installed in a device in the collapsed position and then automatically moves to the expanded position. The filter 310 can automatically move to the expanded position by air pressure, gravity, mechanical push or pull, etc. In an alternative embodiment, the consumer moves the filter to the expanded position prior to installing the filter into a device. The filter 310 can be used to filter any suitable fluid in several applications. For example, the filter 310 can be used in power tools, vacuum cleaners, air purifiers, HVAC systems, automotive applications, etc.

With reference to FIGS. 1 and 2, the filter 310 includes a first or upper housing 312, a second or lower housing 314, and filter media 316. The upper housing 312 includes an inlet opening 318 that provides fluid communication into the filter 310. In some embodiments, a valve 319 is located within the inlet opening 318 to open and close the inlet opening 318. For example, when the filter 310 is ready to be removed from the device (e.g., power tool), the valve 319 is closed so that debris within the filter 310 does not escape through the inlet opening 318. The upper housing 312 has an inner volume 320 (see FIG. 5A) within the housing 312. Likewise, the lower housing 314 includes an inner volume 321. The inner volumes 320, 321 of the upper housing 312 and the lower housing 314 can be equal or one of the volumes can be greater than the other. In various alternatives, the inner volumes of one or both of the upper housing and the lower housing are small or inappreciable due to the shape of the housing. The upper housing 312 and the lower housing 314 can be formed from any suitable material, such as thermoplastic material, thermoset material, molded paper pulp, formed or molded filter media, cardboard, or any other suitable material. Alternatively or additionally, the upper housing 312 forms a support collar 323 for installing the filter 310 in a device, including a power tool. In other embodiments, the housings 312, 314 and therefore filter 310 may have other suitable shapes, for example generally cylindrical.

Figure 3:
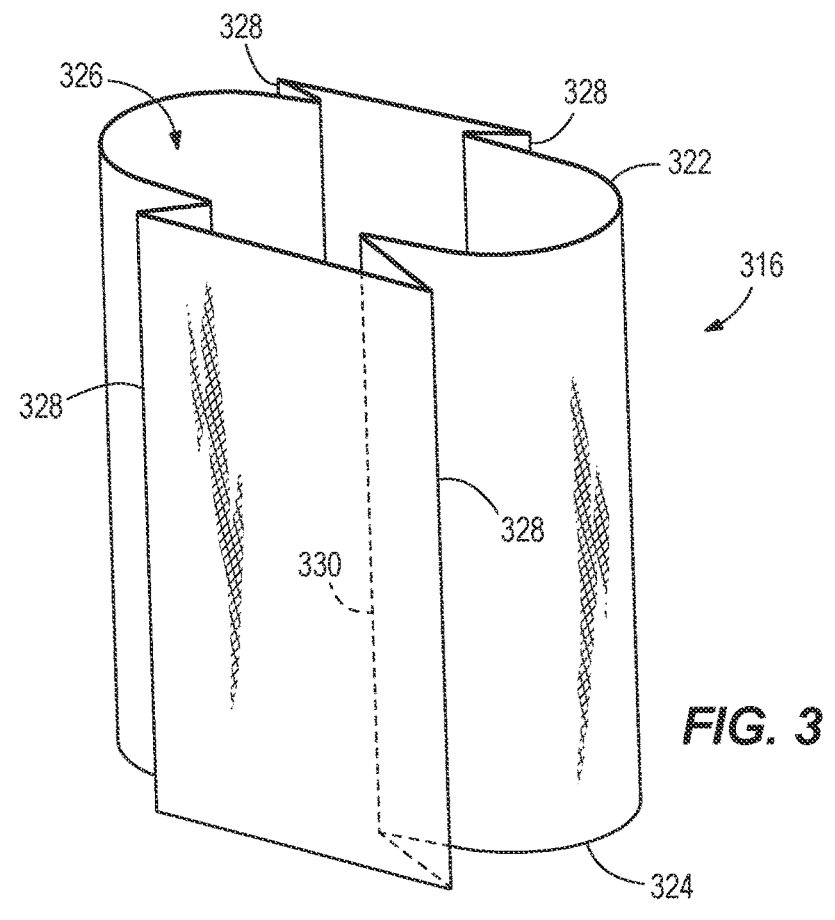
FIG. 3 is a perspective view of the filter of FIG. 2, illustrating filter media of the filter without an upper and lower housing.
Figure 4:
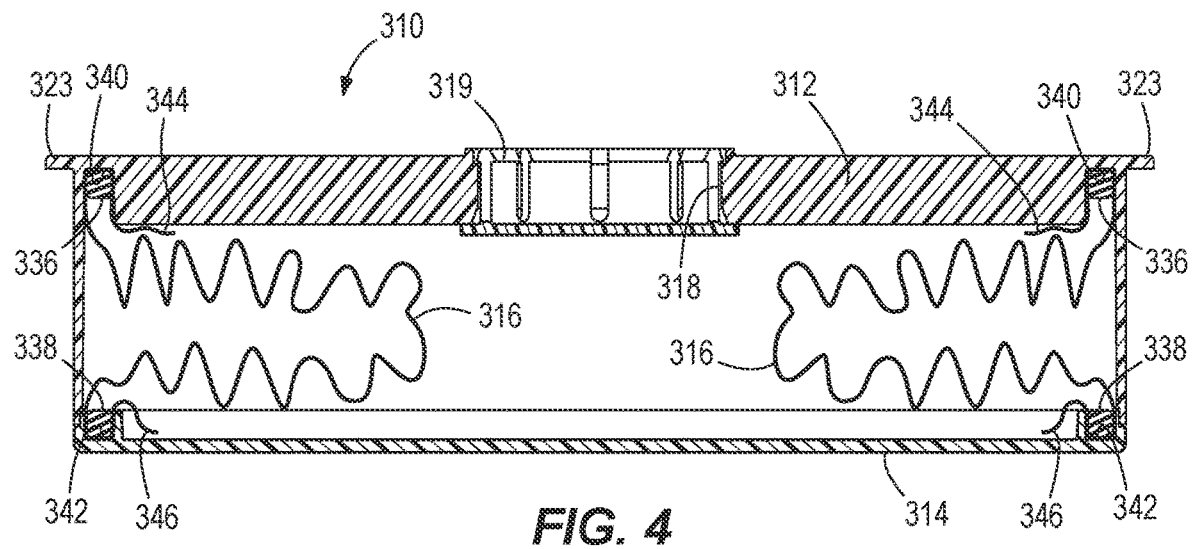
FIG. 4 is a cross-sectional view of the filter in the collapsed position.

With reference to FIG. 3, the filter media 316 includes a first end 322 and a second end 324. The filter media 316 is coupled to the upper housing 312 proximate the first end 322 while, the filter media 316 is coupled to the lower housing 314 proximate the second end 324. An inner volume 326 of the filter media 316 is defined between the first end 322 and the second end 324 of the filter media 316. Optionally, the filter media 316 includes one or more pleats 328 extending between the first end 322 and the second end 324. The pleats 328 enable the filter 310 to enlarge beyond the expanded position in a direction transverse to the direction traveled between the collapsed and expanded positions. In other words, the pleats 328 allow the filter 310 to billow outward in order to collect and store additional debris as the filter 310 fills. The illustrated filter media 316 typically includes a seam 330. Generally, the filter media 316 is a flat piece that is made tubular by joining two ends together, thereby creating the seam 330. As shown, the seam 330 is located within one of the pleats 328 to substantially hide the seam 330. The seam 330 can be formed by sewing, heat welding, crimping, or other suitable means of coupling the two ends together. The filter media 316 can include any suitable filter media, including a HEPA filter media. In some embodiments, the filter media 316 can be reversible and/or washable.

With reference to FIGS. 1 and 2, the filter 310 can move between a collapsed position (FIG. 1) and an expanded position (FIG. 2). In the collapsed position, the filter media 316 is located within the inner volume 320 of the upper housing 312 and/or in the inner volume of the lower housing 314. Also, the upper housing 312 and the lower housing 314 enclose the filter media 316 in the collapsed position. In some embodiments, the upper housing 312 and/or lower housing 314 can snap or otherwise connect together to retain the filter 310 in the collapsed position by interlocking features provided in the upper and lower housings. Alternatively, the filter 310 may be held in the collapsed position by tape, film, bag, or other attachments. Typically, the filter 310 would be supplied to the user in the collapsed position. In the expanded position, the filter media 316 generally expands out to an operative length and is ready for use as a filter. In some applications, the filter 310 automatically moves from the collapsed position to the expanded position. For example, when a flow of dirty fluid enters the filter 310 through the inlet opening 318, the pressure of the fluid automatically expands the filter 310. In other applications, gravity may automatically expand the filter 310, or a mechanism may be used to push or pull one or both housings away from the other.

The inner volume 326 of the filter media, along with the inner volume 320 of the upper housing 312, and the inner volume 321 of the lower housing 314 together define a collection container 332 that stores debris separated by the filter media 316. That is, a dirty fluid (e.g., air and dust, dirt, or other particles) travels into the filter 310 through the inlet opening 318. The dirt or dust is separated from the air flow by the filter media 316 and relatively clean air flows out of the filter 310 through the filter media 316 between the housings 312, 314. This airflow is generally represented by the arrows 334.

Figures 5A, 5B:
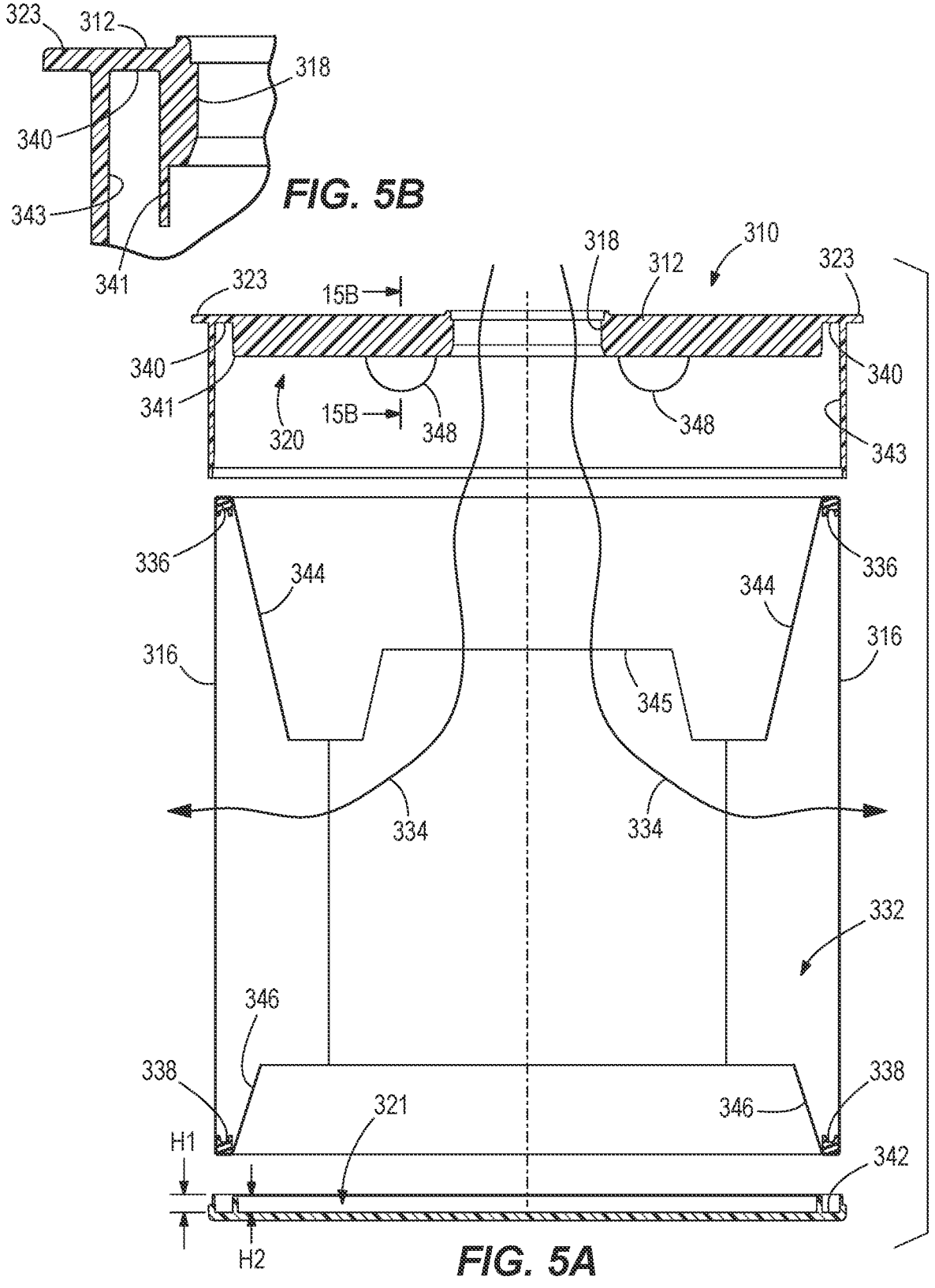
FIG. 5A is an exploded cross-sectional view of the filter in the expanded position.
FIG. 5B is a cross-sectional view of the filter along line 5B-5B of FIG. 5A.

The filter 310 further includes a first attachment member 336 that couples the filter media 316 to the upper housing 312. In the illustrated embodiments, the filter media is folded over the first attachment member 336 between the first end 322 and the second end 324 of the filter media 316, but generally closer to the first end 322, before it is connected to the upper housing 312. Stated another way, all or a portion of the first end 322 of the filter media 316 is folded over before being coupled to the upper housing 312. Similarly, the filter 310 includes a second attachment member 338 that couples the filter media 316 to the lower housing 314 between the first end 322 and the second end 324 of the filter media 316, but closer to the second end 324. The first attachment member 336 is received within a groove 340 of the upper housing 312 holding the filter media in place, whereas the second attachment member 338 is received within a groove 342 of the lower housing 314. The grooves 340, 342 are formed with an inner wall 341 and an outer wall 343. As shown in FIG. 5A, the height H1 of the outer wall 343 is greater than the height H2 of the inner wall 341. In an alternative embodiment, the height H1 of the outer wall 343 is the same as the height H2 of the inner wall 341.

To couple the filter media 316 to the upper housing 312 in the illustrated embodiment, all or a portion of the end of the filter media 316 is folded over the first attachment member 336 and fitted into the groove 340 of the upper housing 312. As such, the filter media 316 is disposed between the groove 340 and the first attachment member 336. The fit between the groove 340 and the attachment member 336 with filter media 316 is a friction or limited clearance fit to wedge the filter media 316 and attachment member 336 into the groove 340 to couple the filter media 316 to the upper housing 312. Alternatively, the attachment member 336 is staked, welded, snap fit, adhered, or otherwise fastened to the upper housing 312 to couple the filter media 316 to the upper housing 312. In one alternative, at least a portion of the edge 322 of the first end 322 of the filter media 316 is retained in the groove 340 by fitting the attachment member 336 into the groove 340. The connection of the filter media 316 to the upper housing 312 is provided around the upper housing 312 inhibiting airflow through the connection.

To couple the filter media 316 to the lower housing 314, the filter media 316 is wrapped around the second attachment member 338 and fitted into the groove 342 of the lower housing 314 in a similar way as described for the filter media 316 coupling to the upper housing 312. As such, the filter media 316 is retained in the groove 342 by fitting the second attachment member 338 into the groove 342. The connection of the filter media 316 to the lower housing 314 is provided around the lower housing 314 inhibiting airflow through the connection. In various alternatives, the connection of the filter media 316 to the lower housing 314 may use a different method than the connection to the upper housing 312. In one alternative, the filter media 316 does not use a lower housing 314, instead closing the second end 324 with a seam or other closure.

The filter 310 may include a first overlapping filter media section 344 and a second overlapping filter media section 346. The first overlapping filter media section 344 is proximate the upper housing 312 and is a result of the first end 322 of the filter media 316 being folded such that at least a portion of the first end 322 extends away from the housing 312 forming the overlapping filter media section 344. In the illustrated embodiment, the first end 322 of the filter media 316 is folded over the attachment member 336 in a manner that the first end 322 extends away from the upper housing 312 a desired length. As such, the filter media 316 overlaps to provide two layers at the first overlapping filter media section 344. The first overlapping filter media section 344 may extend around the perimeter of the filter 310 or may extend along one or more portions of the perimeter of the filter 310. In certain embodiments, all or desired portions of the overlapping filter media 344 may be trimmed, or filter media 316 positioned such that a desired amount of filter media 316 extends beyond the attachment member 336 in predetermined locations. In the embodiment shown in FIG. 15A, the first overlapping filter media section 344 includes a notch 345 in a portion. The notch 345 inhibits parts of a power tool (e.g., a conduit that extends into the filter) from catching on the filter media when the conduit inserted and removed from the filter. The second overlapping filter media section 46 is proximate the lower housing 314 and is a results of the second attachment member 338 bending the filter media 316 in a manner that the second end 324 extends away from the lower housing 314. As such, the filter media 316 overlaps to provide two layers and forms the second overlapping filter media section 346. The second overlapping filter media section 346 may extend around the perimeter of the filter 310 or may extend along one or more portions of the perimeter of the filter 310. In certain embodiments, all or desired portions of the overlapping filter media 46 may be trimmed, or filter media 316 positioned such that a desired amount of filter media 316 extends beyond the second attachment member 338 in predetermined locations. In the illustrated embodiment, both of the first and second overlapping filter media sections 344, 346 are disposed in the inner volume 326 of the filter media 316. However, for certain embodiments the filter 310 may be constructed with the overlapping filter media portions 344, 346 being positioned to the outside of the filter 310.

Figure 6:
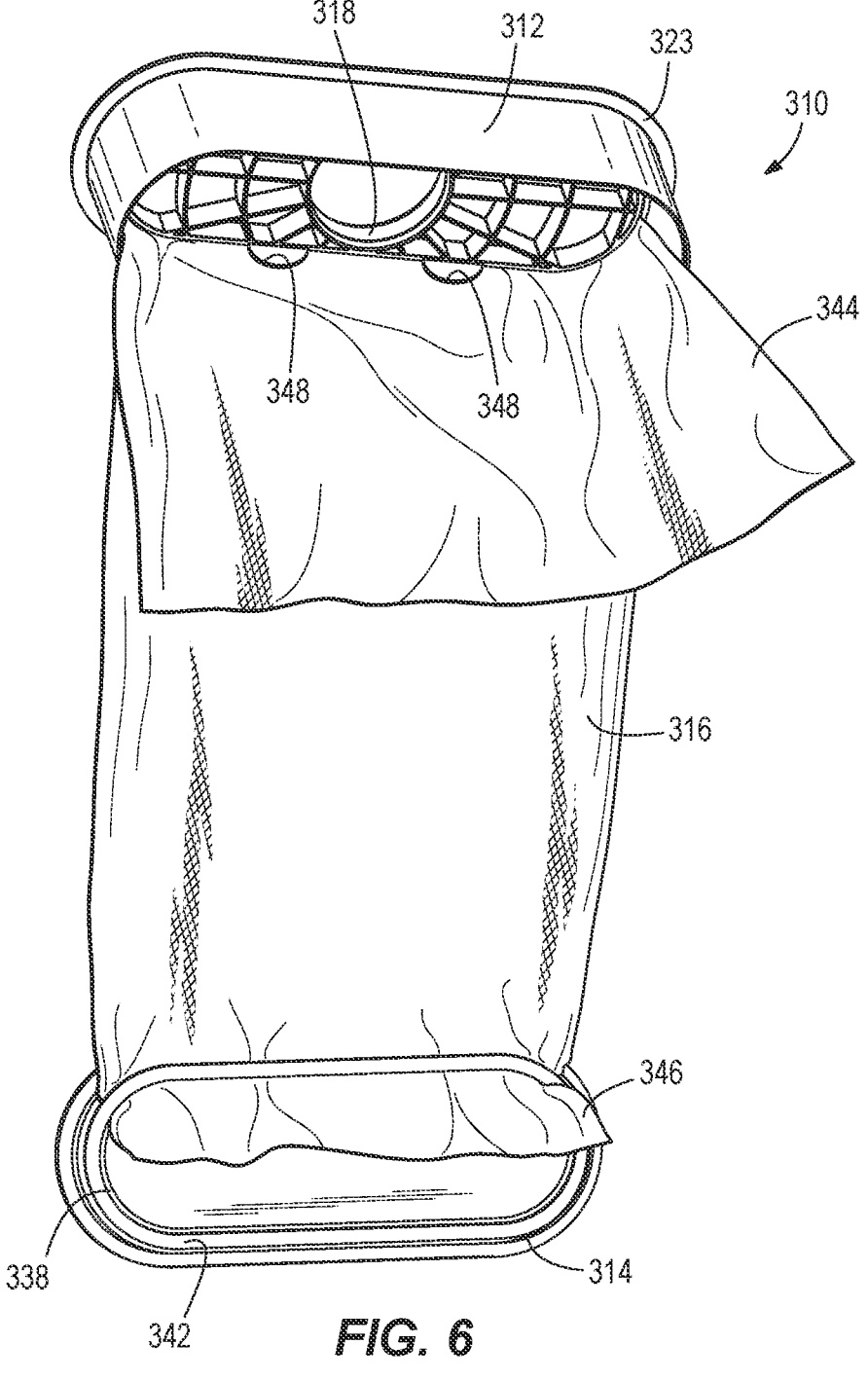
FIG. 6 is a perspective view of an interior of the filter with a portion of the filter media cutaway.

As shown in FIGS. 5A and 6, the upper housing 312 may include one or more extension members 348 adjacent the groove 340. The extensions members 348 are positioned in a location to direct the overlapping filter media section 344 to extend in a direction along the outer wall 343 of the upper housing 312 and filter media 316. The extension members 348 may be integrally formed with the upper housing 312 or may be formed separately and installed in the filter 310.

As previously mentioned, the first overlapping filter media section 344 is proximate the upper housing 314. The length and width and location of the first overlapping filter media section 344 or the second overlapping filter media section 346 may be provided where it is in a direct path of some or all of the airflow (see arrow 334 of FIG. 7A) exiting the device (e.g., a discharge conduit of a power tool or vacuum) to receive impact of impinging debris as the debris enters the filter 310.

Figures 7A, 7B, 7C:
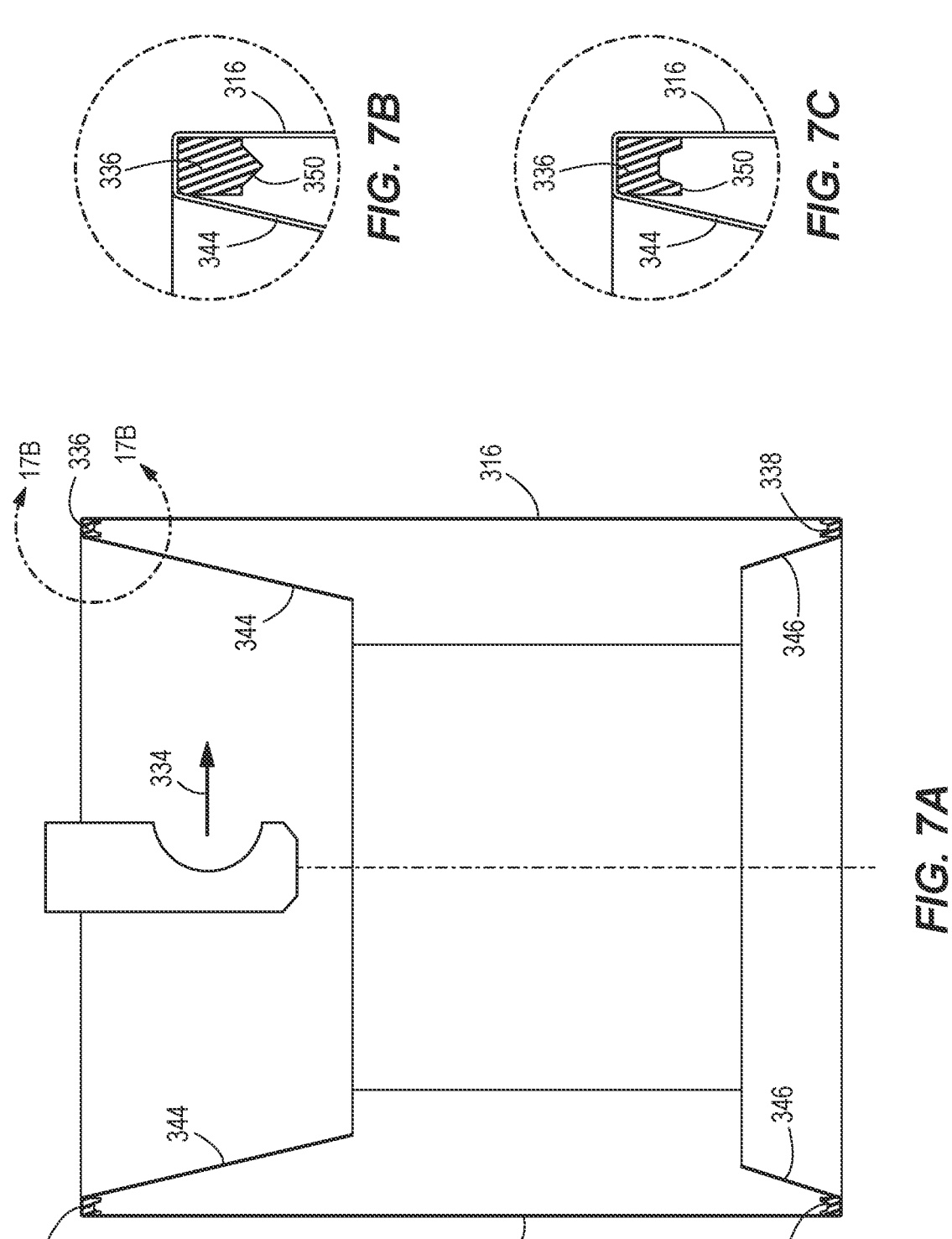
FIG. 7A is a cross-sectional view of the filter, illustrating the filter media of the filter without the upper and lower housing.
FIG. 7B is an enlarged view of the filter of FIG. 7A, illustrating an embodiment of an attachment member.
FIG. 7C is an enlarged view of the filter of FIG. 7A, illustrating another embodiment of an attachment member.

One or both of the attachment members 336, 338 may include a recess, protrusion, or other shape 350 configured for nesting or attaching to a fixture provided to guide the attachment member 336, 338 into the groove 340, 342. As shown in FIGS. 7B and 7C, the attachment member 336, 338 may include the fixturing recess, protrusion, or other shape 350 on the side facing out of the groove 340, 342.

Figures 8A, 8B:
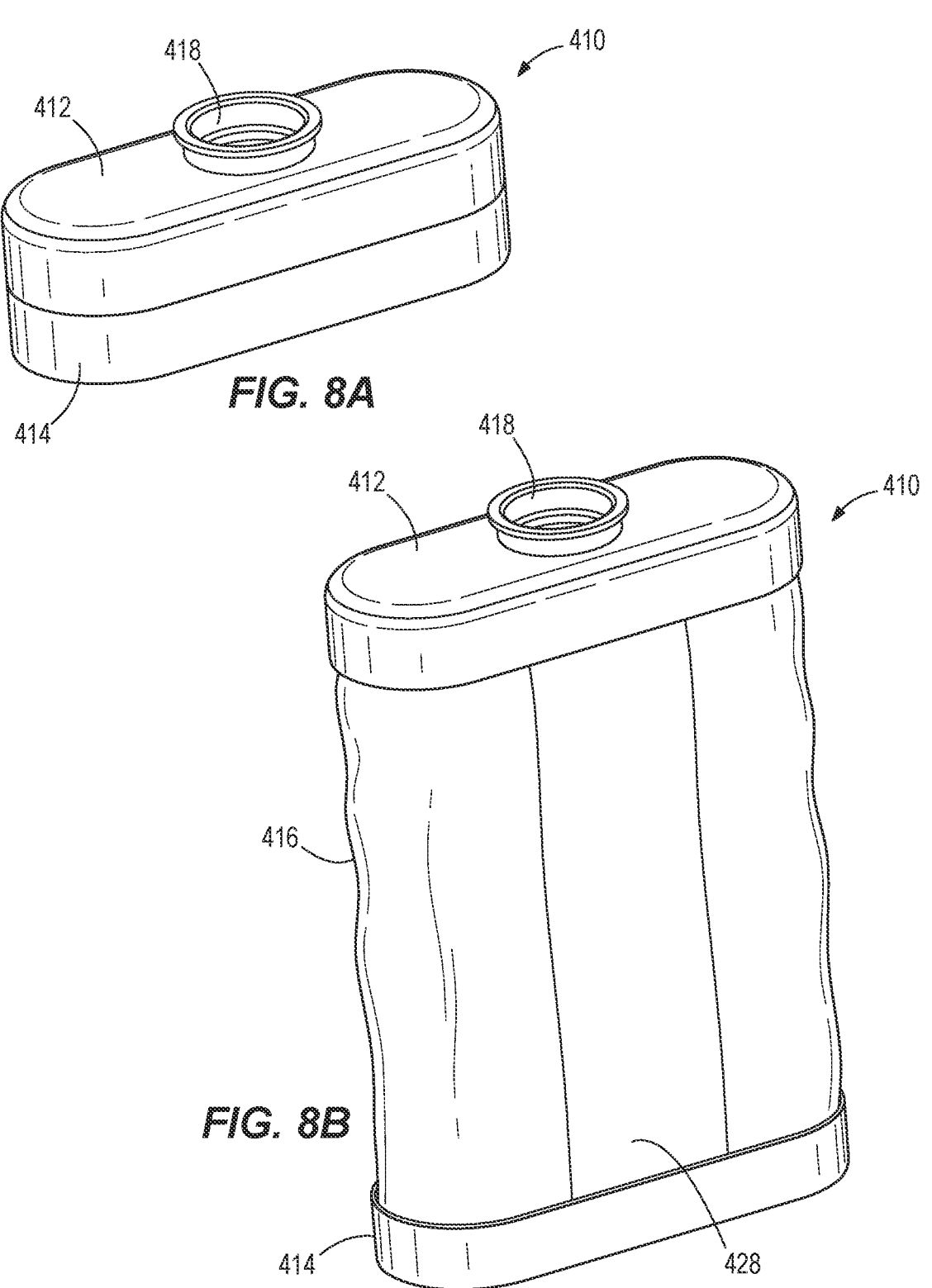
FIG. 8A is a perspective view of a filter in a collapsed position according to an embodiment of the invention.
FIG. 8B is a perspective view of the filter of FIG. 8A in an expanded position.

FIGS. 8A and 8B illustrate a filter 410. The filter 410 can move between a collapsed position (FIG. 8A) and an expanded position (FIG. 8B). The filter 410 may be supplied to the consumer in the collapsed position. Then, in one embodiment, the filter 410 is installed in a device in the collapsed position and then automatically moves to the expanded position. The filter 410 can automatically move to the expanded position by air pressure, gravity, mechanical push or pull, etc. In an alternative embodiment, the consumer moves the filter to the expanded position prior to installing the filter into a device. The filter 410 can be used to filter any suitable fluid in several applications. For example, the filter 410 can be used in power tools, vacuum cleaners, air purifiers, HVAC systems, automotive applications, etc.

Referring to FIGS. 8A and 8B, the filter 410 includes a first or upper housing 412, a second or lower housing 414, and filter media 416. The upper housing 412 includes an inlet opening 418 that provides fluid communication into the filter 410. In some embodiments, a valve is located within the inlet opening 418 to open and close the inlet opening 418. For example, when the filter 410 is ready to be removed from the device (e.g., power tool), the valve is closed so that debris within the filter 410 does not escape through the inlet opening 418. The upper housing 412 has an inner volume 420 (see FIG. 16A) within the housing 412. Likewise, the lower housing 414 includes an inner volume. The inner volumes of the upper housing 412 and the lower housing 414 can be equal or one of the volumes can be greater than the other. The upper housing 412 and the lower housing 414 can be formed from any suitable material, such as thermoplastic material, thermoset material, molded paper pulp, formed or molded filter media, or any other suitable material.

Figure 16A:
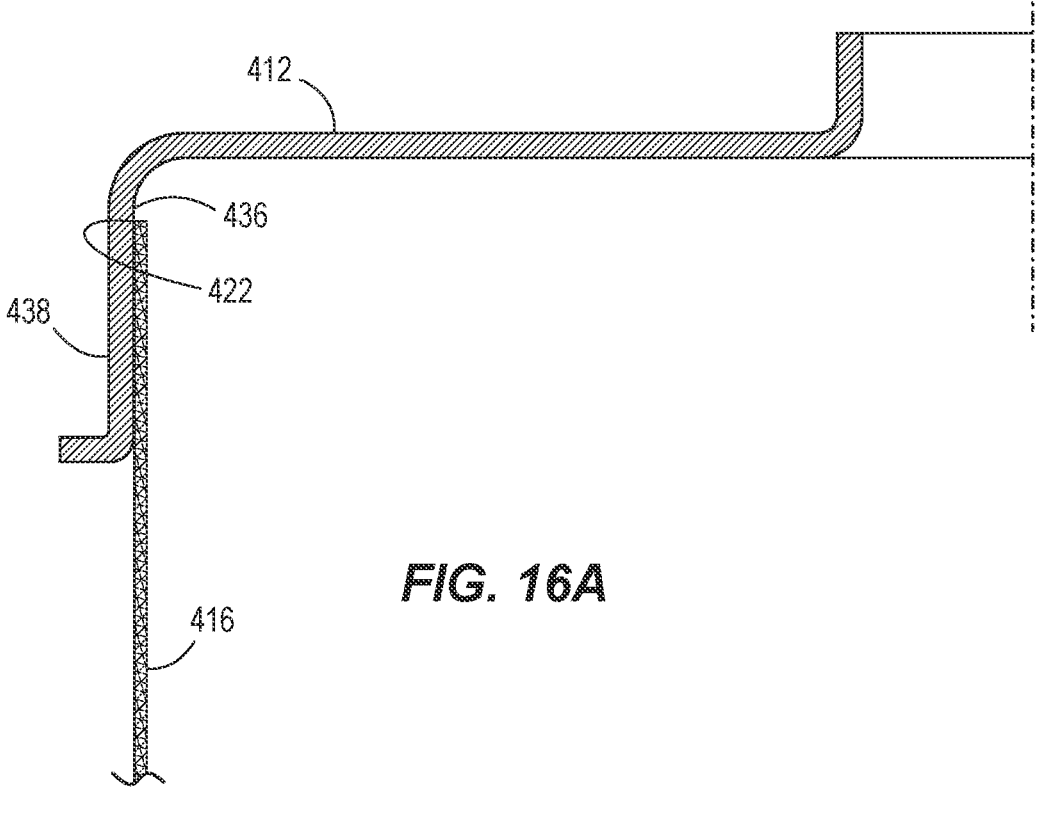
FIG. 16A is a cross-sectional view of a filter according to an embodiment of the invention.

The filter media 416 includes a first end 422 (see FIG. 16A). The filter media 416 is coupled to the upper housing 412 at the first end 422. Likewise, the filter media 416 has a second end and the filter media 416 is coupled to the lower housing 414 at the second end. As will be discussed in more detail below, the first and second ends of the filter media 416 can be attached to the housings 412, 414 using a variety of methods. An inner volume 424 (see FIG. 16A) of the filter media 416 is defined between the first end 422 and the second end (not shown in FIG. 16A) of the filter media 416.

The inner volume 424 of the filter media, along with the inner volume 420 of the upper housing 412, and the inner volume of the lower housing 414 together define a collection container 425 that stores debris separated by the filter media 416. That is, a dirty fluid (e.g., air and dust, dirt, or other particles) travels into the filter 410 through the inlet opening 418. The dirt or dust is separated from the air flow by the filter media 416 and relatively clean air flows out of the filter 410 through the filter media 416 between the housings 412, 414. This airflow is generally represented by the arrows 426 in FIG. 16A.

Referring to FIG. 8B, in one embodiment, a panel 428 is located at a seam of the filter media 416, for example along a vertical seam. In one alternative, the panel 428 is clear to allow a user to see how much debris is in the filter 410 to indicate to the user when the collection container 425 is full. In addition or in other embodiments, the panel 428 can be decorative and/or can include odor absorbing material.

Figure 8C:
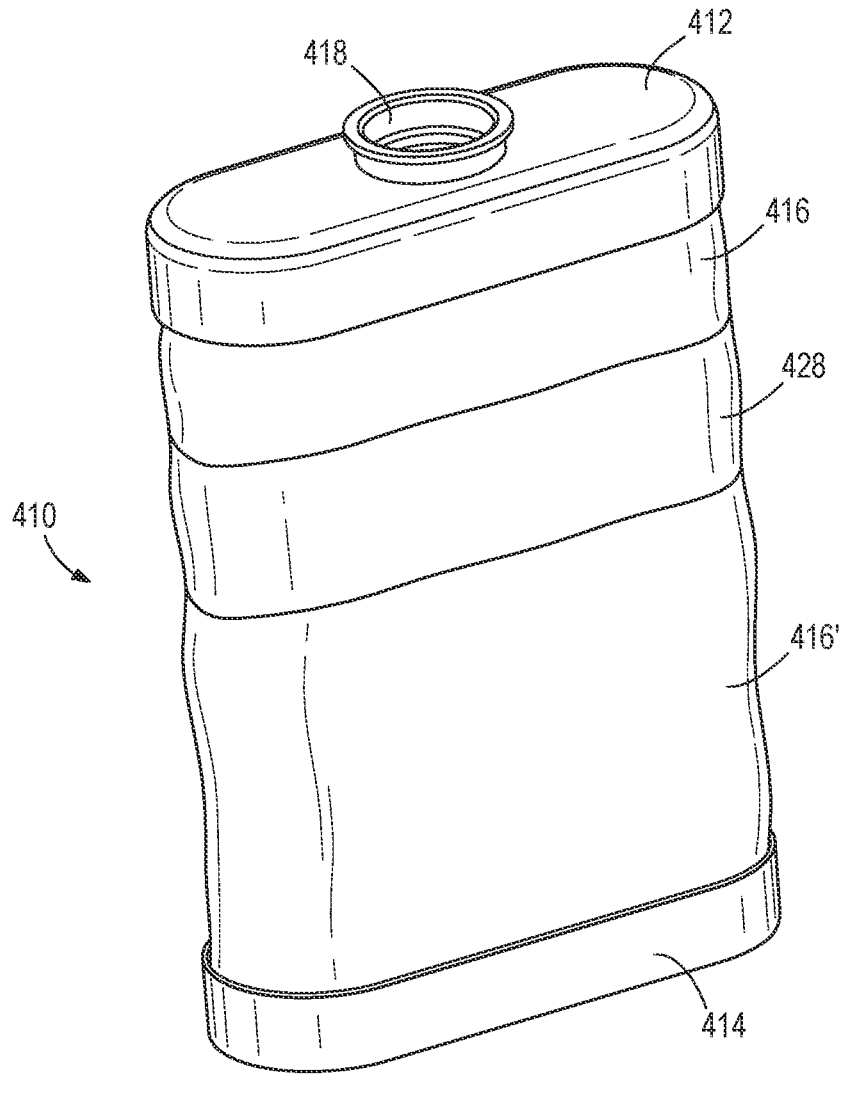
FIG. 8C is a perspective view of an alternative embodiment of the filter of FIG. 8A in an expanded position.

Referring to FIG. 8C, in an alternative embodiment, the filter may be constructed such that the optional panel 428 may be provided along a horizontal seam. In this construction, the filter media 416 is divided into two sections, and the filter media 416 is attached to the housing 412. The second piece of filter media 416' is attached to the filter media 416, optionally with the panel 428 provided along the horizontal seam between the filter media sections 416, 416'.

Referring to FIGS. 8A and 8B, the filter 410 can move between a collapsed position (FIG. 8A) and an expanded position (FIG. 8B). In the collapsed position, the filter media 416 is located within the inner volume 420 (the inner volume being shown in one embodiment in FIG. 16A) of the upper housing 412 and/or in the inner volume of the lower housing 414. Also, the upper housing 412 and the lower housing 414 enclose the filter media 416 in the collapsed position. In some embodiments, the upper housing 412 and/or lower housing 414 can snap or otherwise connect together to retain the filter 410 in the collapsed position by interlocking features provided in the upper and lower housings. Alternatively, the filter 410 may be held in the collapsed position by tape, film, bag, or other attachments. Typically, the filter 410 would be supplied to the user in the collapsed position. In the expanded position, the filter media 416 generally expands out to an operative length and is ready for use as a filter. In some applications, the filter 410 automatically moves from the collapsed position to the expanded position. For example, referring to FIG. 27A, when a flow of dirty fluid (represented by arrows 426) enters the filter 410 through the inlet opening 418, the pressure of the fluid automatically expands the filter 410. In other applications, gravity may automatically expand the filter 410, or a mechanism may be used to push or pull one or both housings away from the other.

Figures 9A, 9B:
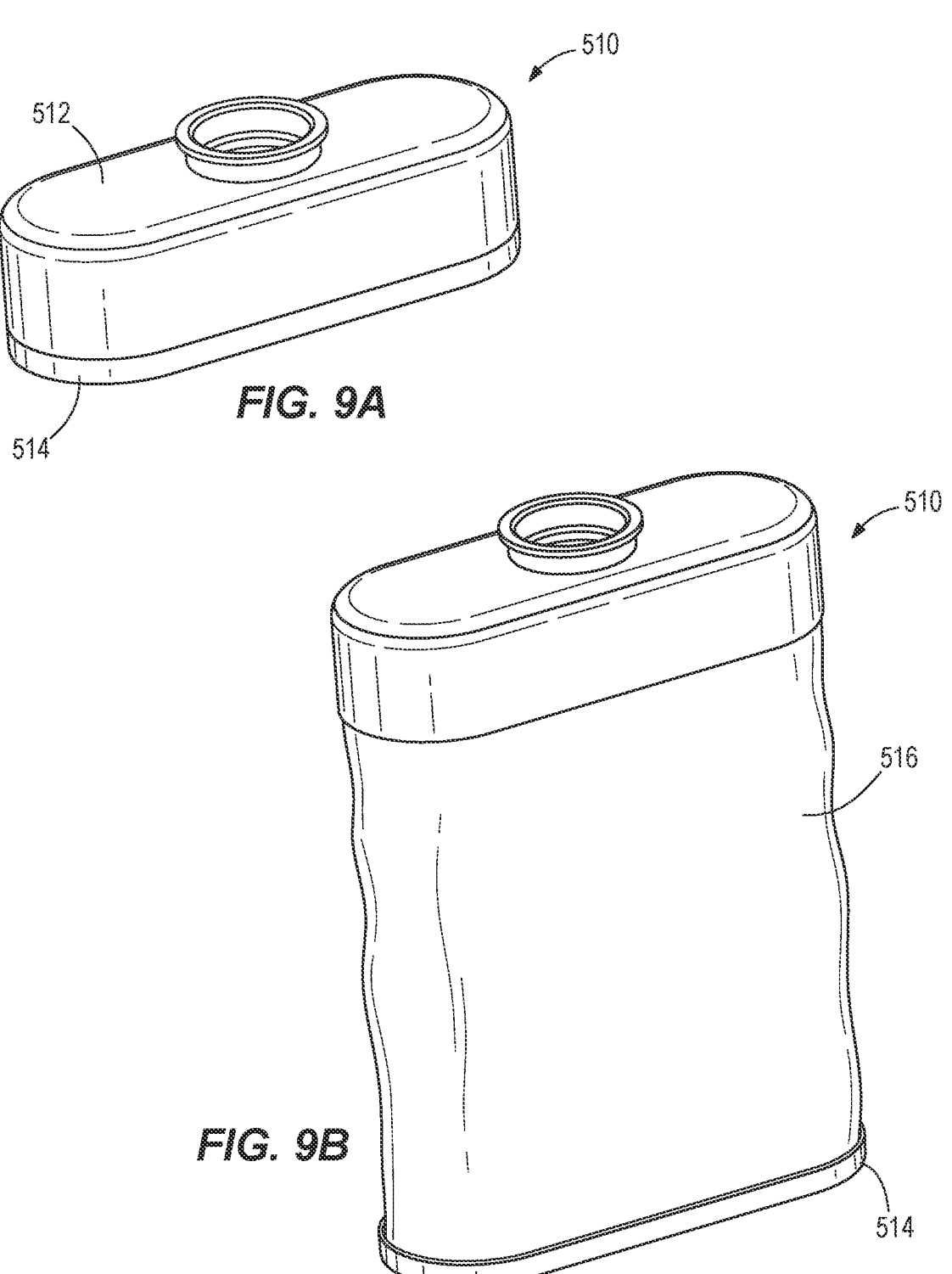
FIG. 9A is a perspective view of a filter in a collapsed position according to an embodiment of the invention.
FIG. 9B is a perspective view of the filter of FIG. 9A in an expanded position.

FIGS. 9A and 9B illustrate a filter 510 according to another embodiment. The filter 510 includes features similar to the filter 410 of FIGS. 8A and 8B and only some differences between the filters 410, 510 will be discussed. The filter 510 includes a lower housing 514 that is generally flat and has very little, if any, inner volume. In the illustrated embodiment, in the collapsed position, the filter media 516 is virtually entirely received in the inner volume of the upper housing 512. In this embodiment, the lower housing 514 functions as a cap to close the upper housing 512 and retain the filter media 516 in the collapsed position. Alternatively, at least a portion of the filter media 516 is received in the inner volume of the upper housing 512.

Figure 10A:
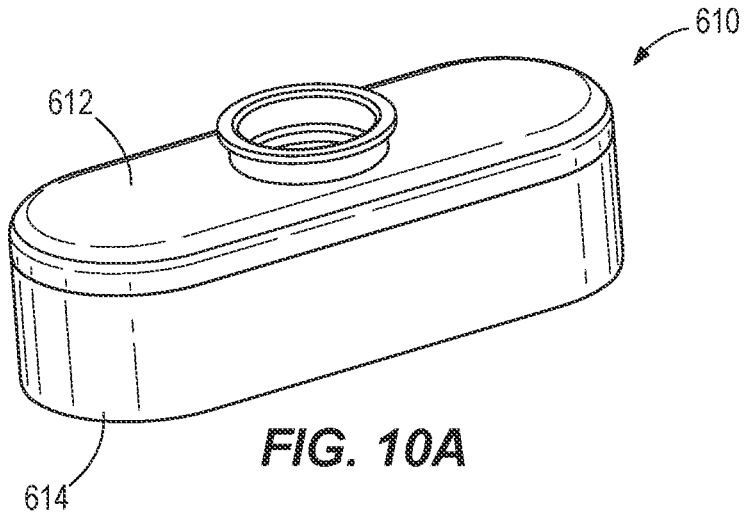
FIG. 10A is a perspective view of a filter in a collapsed position according to an embodiment of the invention.
Figure 10B:
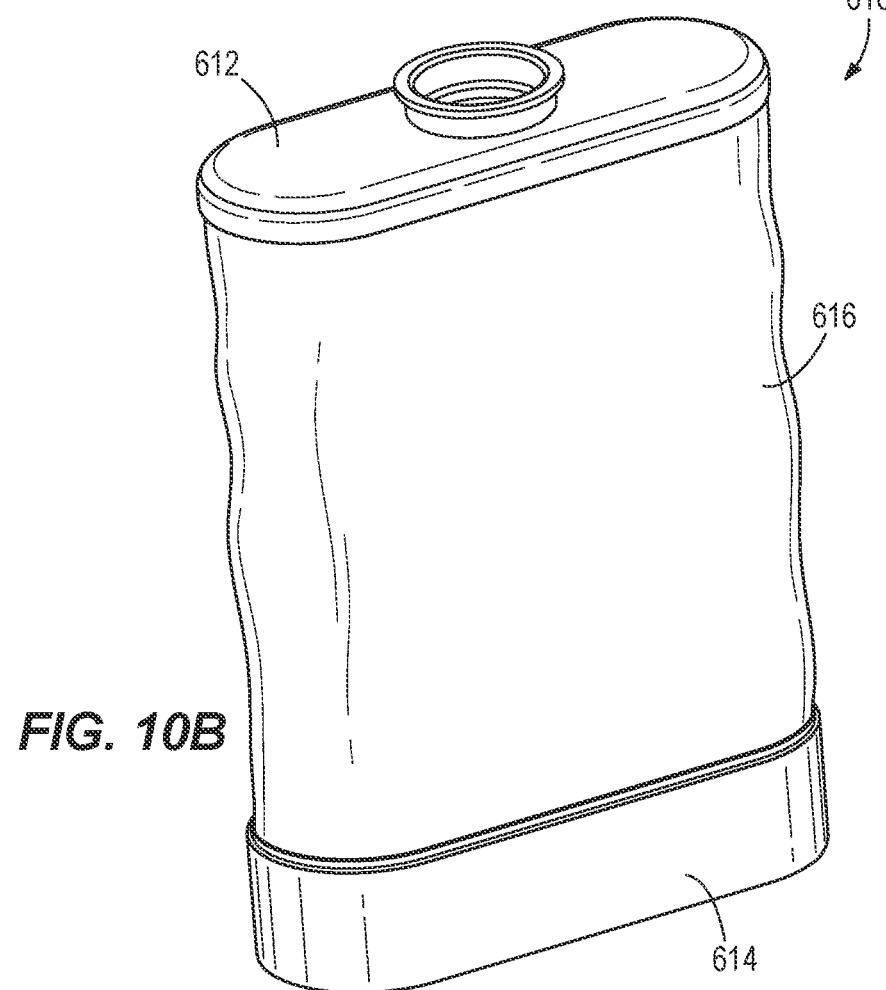
FIG. 10B is a perspective view of the filter of FIG. 10A in an expanded position.

FIGS. 10A and 10B illustrate a filter 610 according to another embodiment. The filter 610 includes features similar to the filters discussed above and only some differences between the filters will be discussed. The filter 610 includes an upper housing 612 that is generally flat and has very little, if any, inner volume. In the illustrated embodiment, in the collapsed position, the filter media 616 is virtually entirely received in the inner volume of the lower housing 614. In this embodiment, the upper housing 612 functions as a cap to close the lower housing 614 and retain the filter media 616 in the collapsed position. Alternatively, at least a portion of the filter media 616 is received in the inner volume of the lower housing 614.

Figures 11A, 11B:
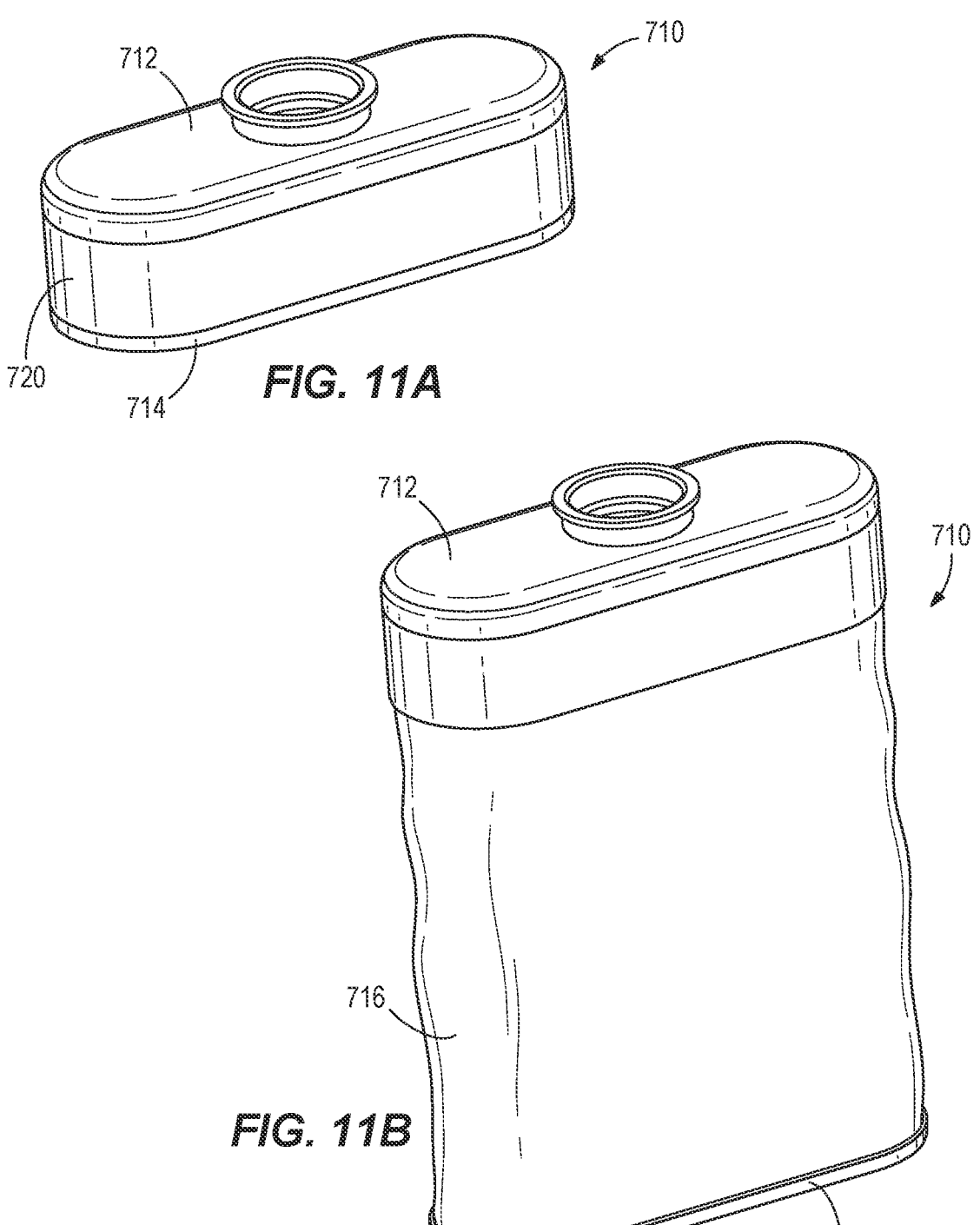
FIG. 11A is a perspective view of a filter in a collapsed position according to an embodiment of the invention.
FIG. 11B is a perspective view of the filter of FIG. 11A in an expanded position.
Figures 12A, 12B:
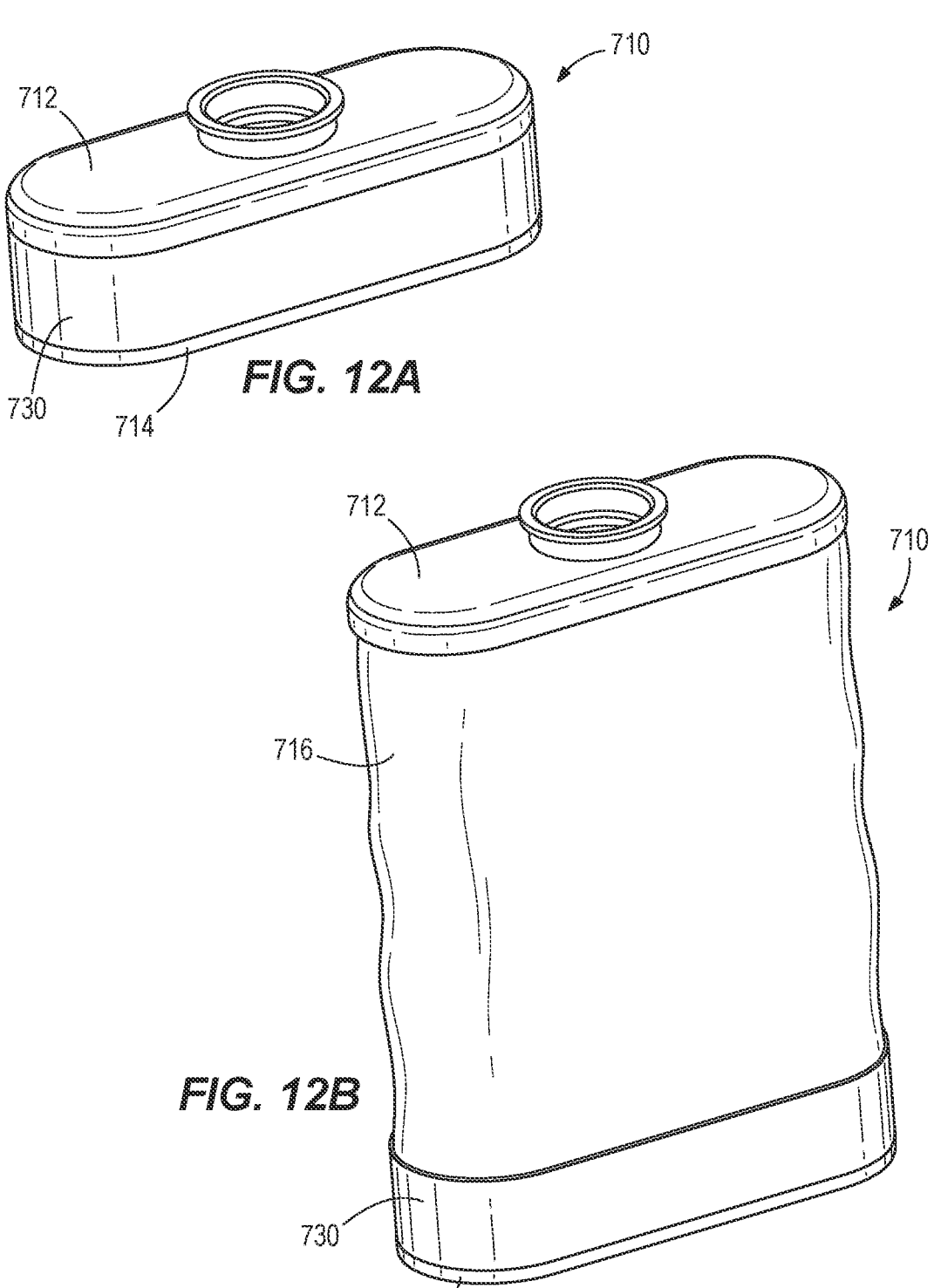
FIG. 12A is a perspective view of a filter in a collapsed position according to an embodiment of the invention.
FIG. 12B is a perspective view of the filter of FIG. 12A in an expanded position.

FIGS. 11A, 11B, 12A and 12B illustrate a filter 710 according to another embodiment. The filter 710 includes features similar to the filters discussed above and only some differences between the filters will be discussed. The filter 710 includes an upper housing 712 and a lower housing 714 and either or both of the upper and lower housings may be generally flat or may have an inner volume. The filter 710 further includes an intermediate portion 730. In the illustrated embodiment, in the collapsed position, the filter media 716 is received between the housings 712, 714 and surrounded and enclosed by the intermediate portion 730. In some embodiments, the intermediate portion 730 is a tear-away style component that remains attached to either the upper housing 712 or the lower housing 714. For example, there is a perforation or similar attachment between the intermediate portion 730 and the upper housing 712 and/or lower housing 714. The perforation is torn or broken to allow the filter 710 to move to the expanded position (FIG. 11B). FIG. 11B illustrates the intermediate portion 730 remaining attached to the upper housing 712 in the expanded position. FIG. 12B illustrates the intermediate portion 730 remaining attached to the lower housing 714 in the expanded position. In yet another alternative, the intermediate portion is connected to the upper housing and/or lower housing with engaging features such as snap-fits, friction-fits, protrusions, tabs, hooks, interlocks, or other features that engage corresponding features such as recesses, openings, snap-fits, friction-fits, tabs, protrusions, hooks, interlocks, or other features to connect the intermediate portion with the adjacent housing. Engaging features between the intermediate portion and adjacent housings may be configured so that the connection to one of the adjacent housings is stronger than the connection to the other housing to control whether the intermediate portion remains with the upper housing or the lower housing when moving to the expanded position.

Figures 13A, 13B:
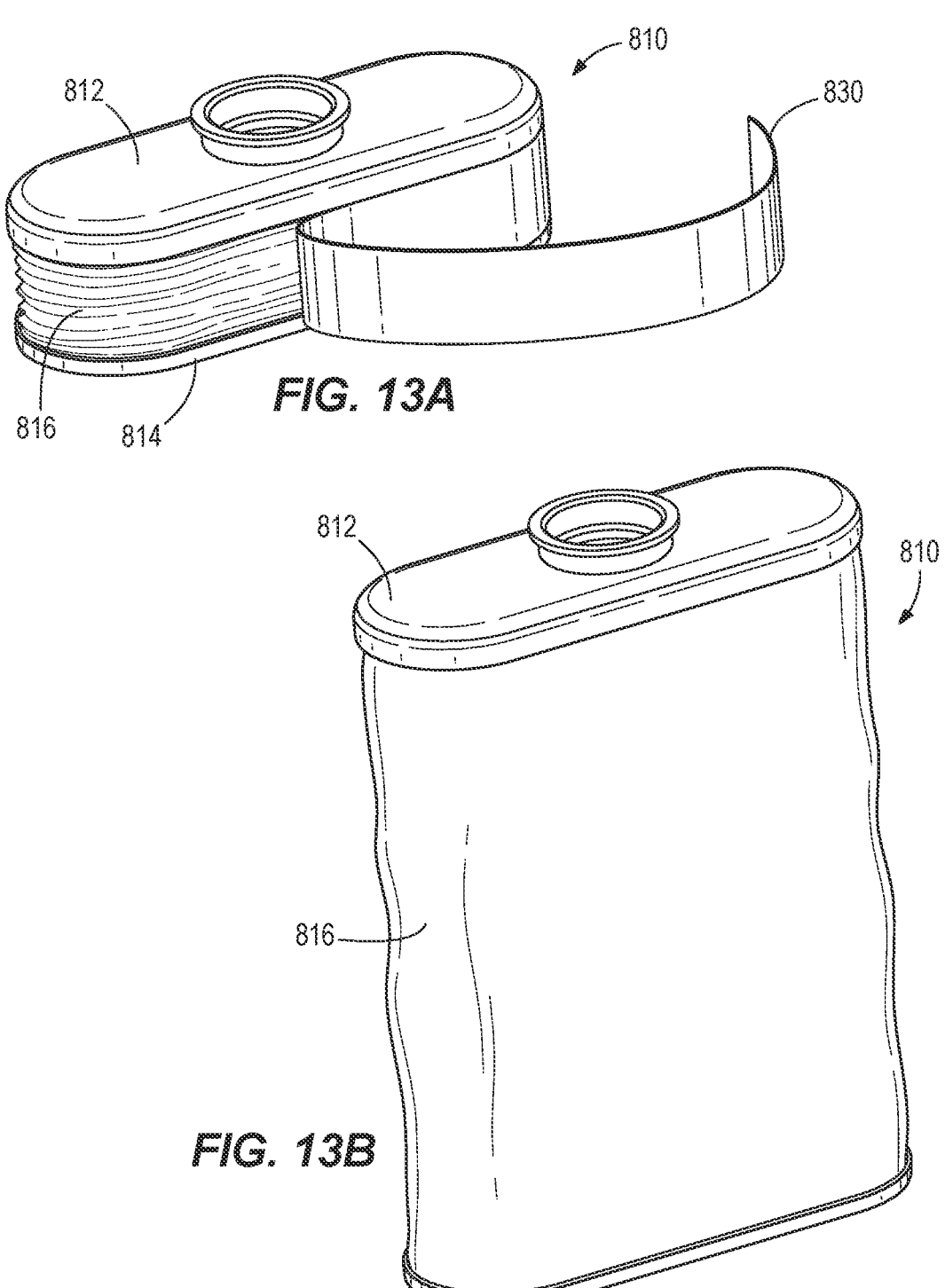
FIG. 13A is a perspective view of a filter in a collapsed position according to an embodiment of the invention.
FIG. 13B is a perspective view of the filter of FIG. 13A in an expanded position.

FIGS. 13A and 13B illustrate a filter 810 according to another embodiment. The filter 810 includes features similar to the filters discussed above and only some differences between the filters will be discussed. In the illustrated embodiment, the filter 810 includes an upper housing 812 and a lower housing 814 and either or both of the upper and lower housings may be generally flat or may have an inner volume. The filter 810 further includes an intermediate portion 830, and in the collapsed position, the filter media 816 is virtually entirely received between the housings 812, 814 and surrounded and enclosed by the intermediate portion 830. In the illustrated embodiment, the intermediate portion 830 is a tear-away style component that the user removes (as illustrated in FIG. 13A) from connection with both housings 812, 814 before using the filter 810. In some embodiment, the intermediate portion 830 can be formed by paper, film, tape, paperboard, a sleeve, or other suitable components. In one alternative, the intermediate portion and the lower housing are combined into one removable or tear-away component, with the bottom of the filter media being closed with a seam.

Figure 14A:
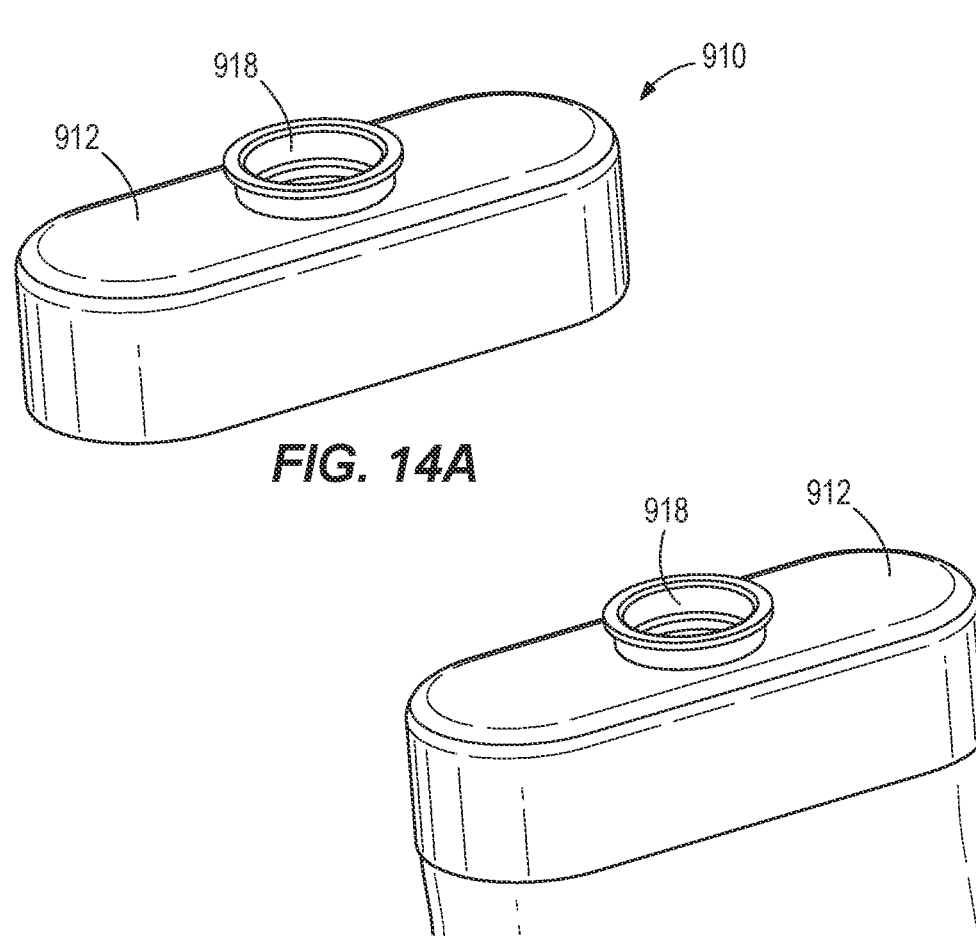
FIG. 14A is a perspective view of a filter in a collapsed position according to an embodiment of the invention.
Figure 14B:
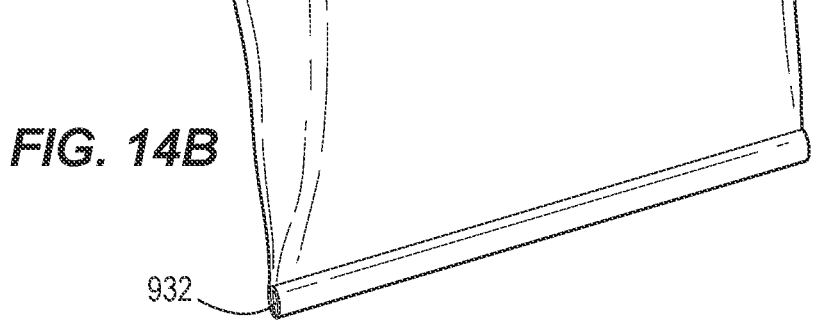
FIG. 14B is a perspective view of the filter of FIG. 14A in an expanded position.

FIGS. 14A and 14B illustrate a filter 910 according to another embodiment. The filter 910 includes features similar to the filters discussed above and only some differences between the filters will be discussed. The filter 910 includes an upper housing 912 similar to the housing 412 of the filter 410 of FIGS. 8A and 8B. The filter 910 further includes a lower end 932 of the filter media 916 that is closed with a seam, illustrated in FIG. 14B as a flat seam or rolled seam. In the collapsed position, the filter media 916 is entirely received in the inner volume of the upper housing 912. For example, the filter media 916 can be rolled up into the upper housing 912. In some embodiments, the filter media 916 is enclosed in the collapsed position in the upper housing 912 by a closure device on the bottom of the upper housing 912. The closure device can include film, foil, paper, a cap, tape, bag, sleeve, or other suitable devices holding the filter media 916 and the upper housing 912 in the collapsed position. The closure device may include a perforation, slit, tear line, or hinge that allows the filter media 916 to move to the expanded position. In some embodiments, the closure device or cover would remain in place during and after installation of the filter 910 in the device. Then, the device may include a feature that automatically opens or shears the cover allowing the filter media to move to the expanded position. Alternatively or in addition, airflow from the device through the inlet opening 918 causes the filter media 916 to automatically expand and tear, push, and/or swing open the closure device, automatically expanding the filter 910. In other embodiments, the closure device may be removed, such as by peeling or tearing, by the user before or immediately after installing the filter 910.

Figures 15A, 15B, 15C:
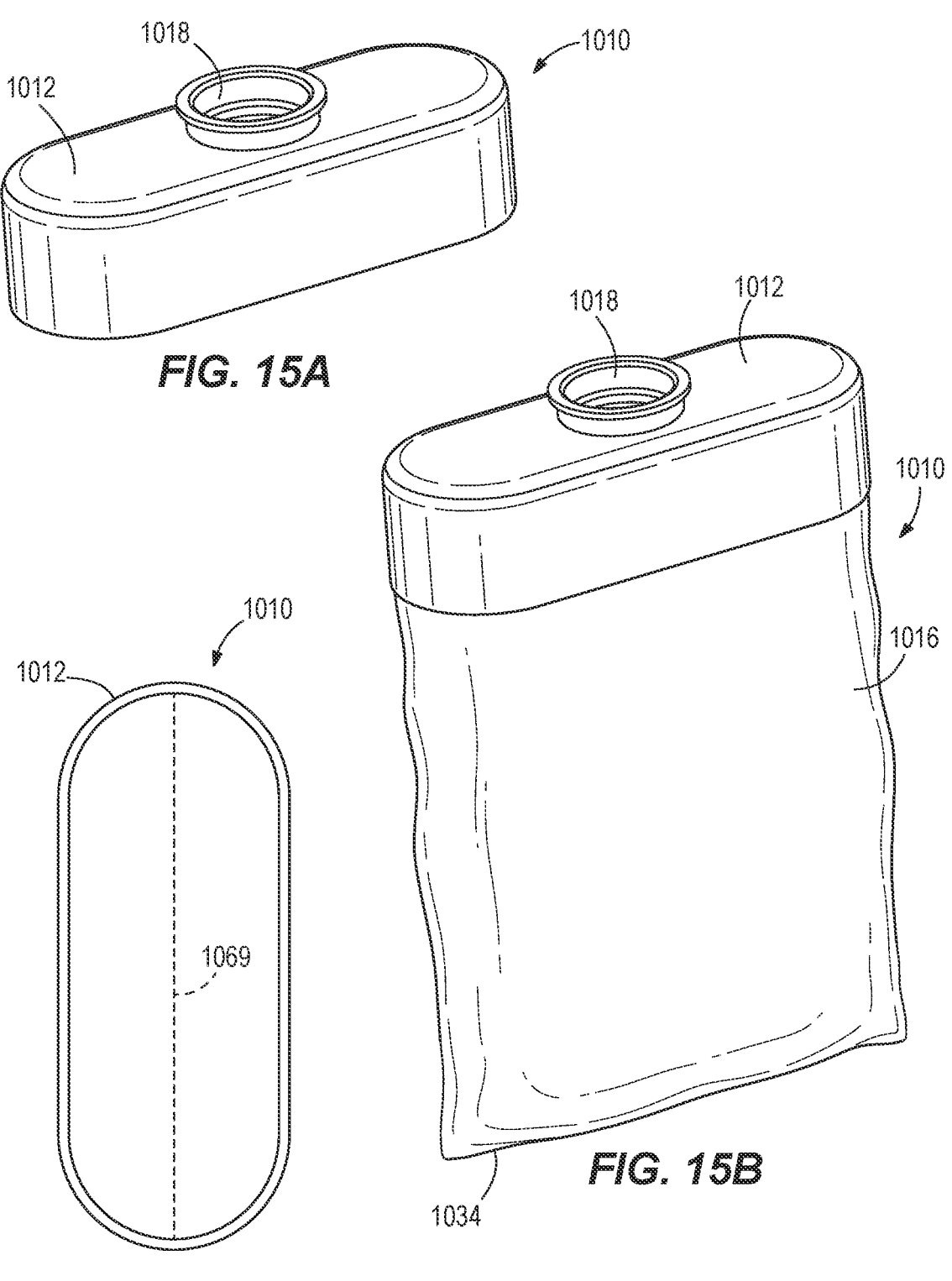
FIG. 15A is a perspective view of a filter in a collapsed position according to an embodiment of the invention.
FIG. 15B is a perspective view of the filter of FIG. 15A in an expanded position.
FIG. 15C is a bottom side view of the filter of FIG. 15A in the collapsed position.

FIGS. 15A-15C illustrate a filter 1010 according to another embodiment. The filter 1010 includes features similar to the filters discussed above and only some differences between the filters will be discussed. The filter 1010 includes an upper housing 1012 similar to the housing 412 of the filter 410 of FIGS. 8A and 8B or any other disclosed embodiment. The filter 1010 further includes a lower end of the filter media 1016 that includes a gusset bottom 1034. The gusset bottom 1034 can be formed from media material, thermoplastic molded or die cut material, film, foil, or other suitable materials. In some embodiments, the gusset bottom 1034 is air permeable. Also in some embodiments, the gusset bottom 1034 can be a self-standing type gusset. In the collapsed position, the filter media 1016 is at least partially received in the inner volume of the upper housing 1012. In some embodiments, the filter media 1016 is enclosed in the collapsed position in the upper housing 1012 by a closure device on the bottom of the upper housing 1012. The closure device can include film, foil, paper, a cap, tape, bag, sleeve, or other suitable devices holding the filter media 1016 and the upper housing 1012 in the collapsed position. The closure device may include a perforation 1069, slit, tear line, or hinge that allows the filter media 1016 to move to the expanded position. In some embodiments, the closure device or cover would remain in place during and after installation of the filter 1010 in the device. Then, the device may include a feature that automatically opens or shears the cover. Alternatively or in addition, airflow from the device through the inlet opening 1018 causes the filter media 1016 to automatically expand and tear, push, and/or swing open the closure device, automatically expanding the filter 1010. In other embodiments, the closure device may be removed, such as by peeling or tearing, by the user before or immediately after installing the filter 1010.

Figure 16B:
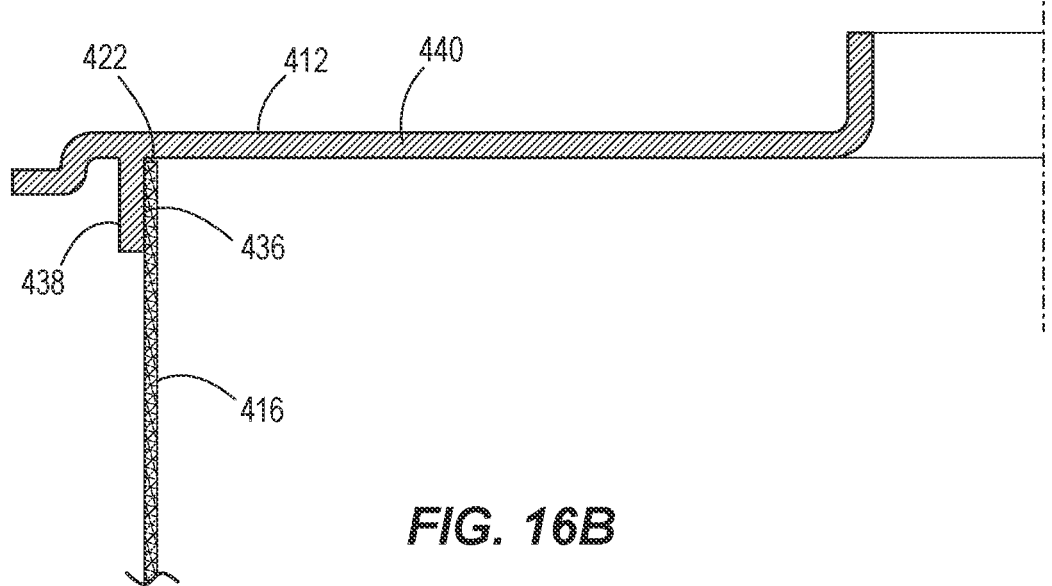
FIG. 16B is a cross-sectional view of a filter according to an embodiment of the invention.

FIG. 16A illustrates one possible way to attach the filter media 416 to the upper housing 412 (or any of the upper housings described herein). In the embodiment of FIG. 16A, the filter media 416 is welded onto an inside surface 436 of a sidewall 438 of the upper housing 412 at the first end 422 of the filter media 416. The media 416 can also be attached to the housing 412 using adhesive. In other embodiments, including when the upper housing 412 is formed from thermoplastic, the housing 412 may be overmolded onto the filter media 416. FIG. 16B illustrates the attachment described above with regard to FIG. 16A except that the housing 412 has a different shaped sidewall 438 and the end 422 of the filter media 416 abuts a top wall 440 of the housing 412. In the embodiments illustrated in FIGS. 16A and 16B, the attachment is generally radial or transverse to the direction of the filter media, with a mandrel, horn, or other attachment process support being provided through the lower end of the filter prior to the lower end being closed.

Figure 17A:
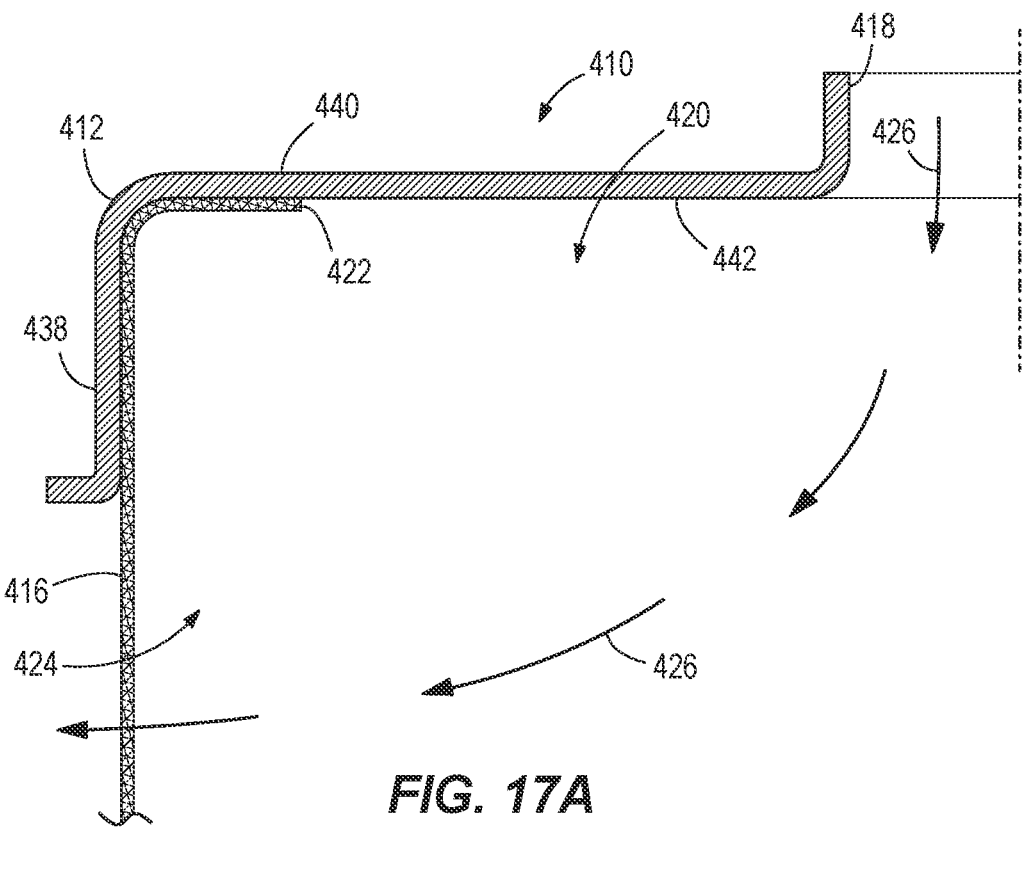
FIG. 17A is a cross-sectional view of a filter according to an embodiment of the invention.
Figure 17B:
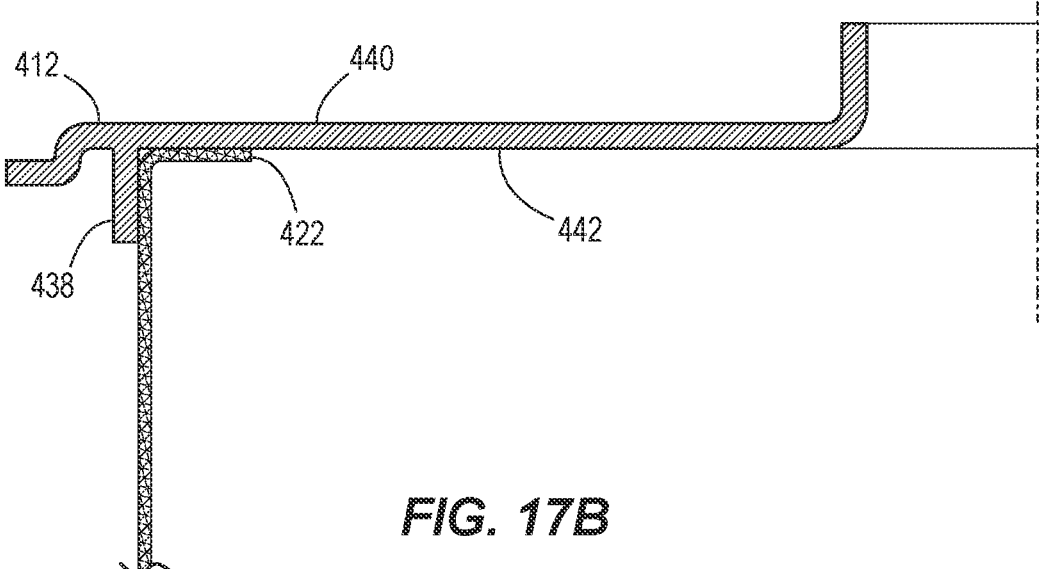
FIG. 17B is a cross-sectional view of a filter according to an embodiment of the invention.

FIG. 17A illustrates another possible way to attach the filter media 416 to the upper housing 412 (or any of the upper housings described herein). In the embodiment of FIG. 17A, the filter media 416 is welded onto an inside surface 442 of the top wall 440 of the upper housing 412 at the first end 422 of the filter media 416. Alternatively, the media 416 can be attached to the housing 412 using adhesive. In other embodiments, not shown, when the upper housing 412 is formed from thermoplastic, the housing 412 may be overmolded onto the filter media 416. FIG. 27B illustrates the attachment described above with regard to FIG. 17A except that the housing 412 has a different shaped sidewall 438. In the embodiments illustrated in FIGS. 17A and 17B, the attachment is generally axial or along the direction of the filter media, with a mandrel, horn, or other attachment process support being provided through the lower end of the filter prior to the lower end being closed.

Figures 18A, 18B, 18C:
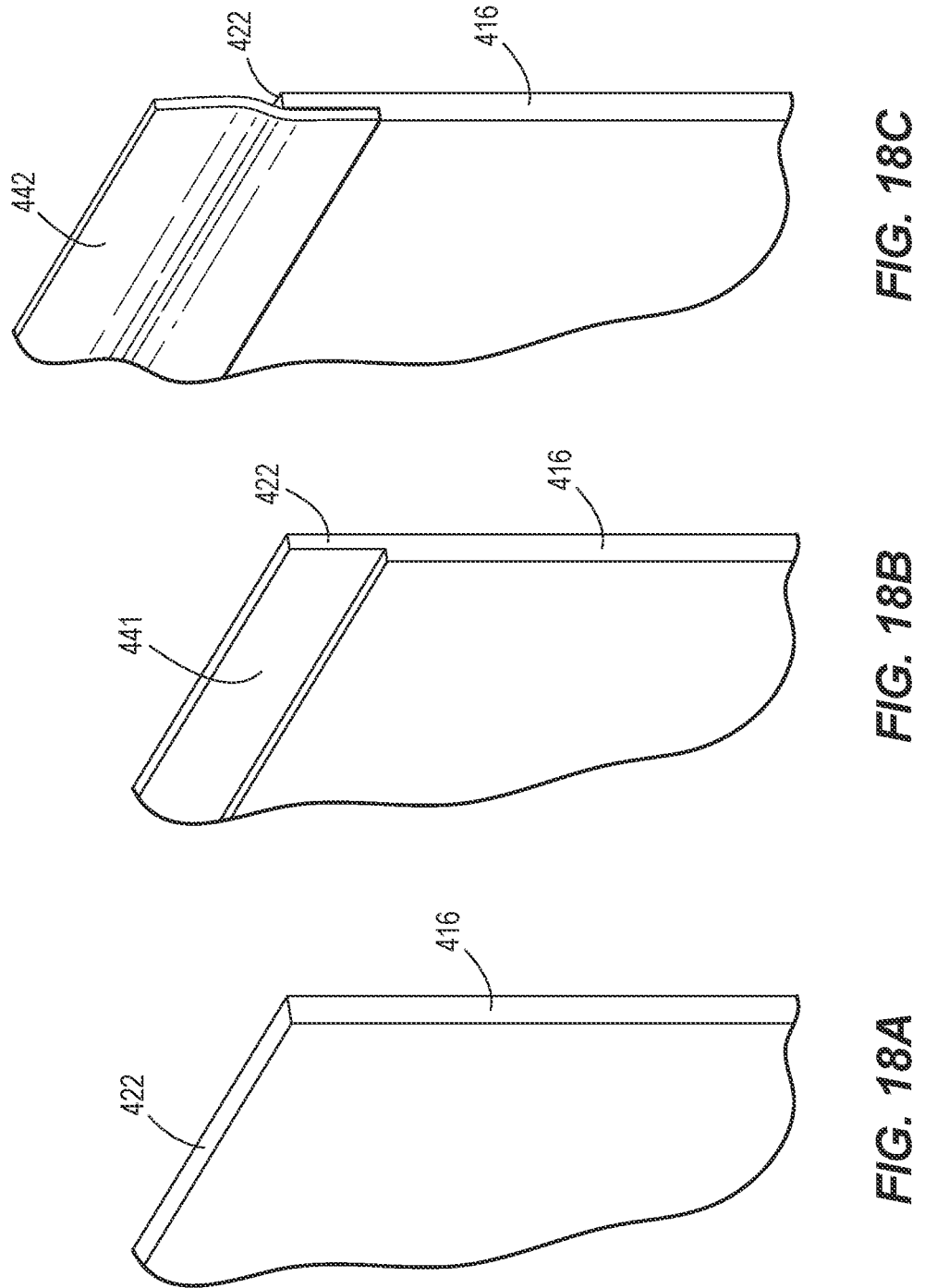
FIG. 18A is a perspective view of filter media for use in a filter embodying the invention.
FIG. 18B is a perspective view of filter media for use in a filter embodying the invention.
FIG. 18C is a perspective view of filter media for use in a filter embodying the invention.

FIGS. 18A-18C illustrate how the first end 422 of the filter media 416 may be prepared before attaching the filter media 416 to the housing 412 (similarly, how the second end of the filter media 416 could be prepared before attachment to the lower housing 414). FIG. 18A illustrates the first end 422 of the filter media 416 in its original thickness and the first end 422 can be attached to the housing 412 in its original thickness. Alternatively, as illustrated in FIG. 18B, the filter media 416 can be compressed along the first end 422 to create an area 441 of reduced thickness and increased density. The area 441 of reduced thickness is where the welding or overmolding to the housing 412 will be made. FIG. 18C illustrates another embodiment where a secondary strip of material 442 is welded other otherwise attached to the end 422 of the filter media 416. Then, the secondary strip of material 442 is welded, overmolded, or otherwise attached to the housing 412. In some embodiments, the secondary strip of material 442 includes a film and/or extrusion and can be applied to one or both sides of the filter media 416.

Figures 19, 20:
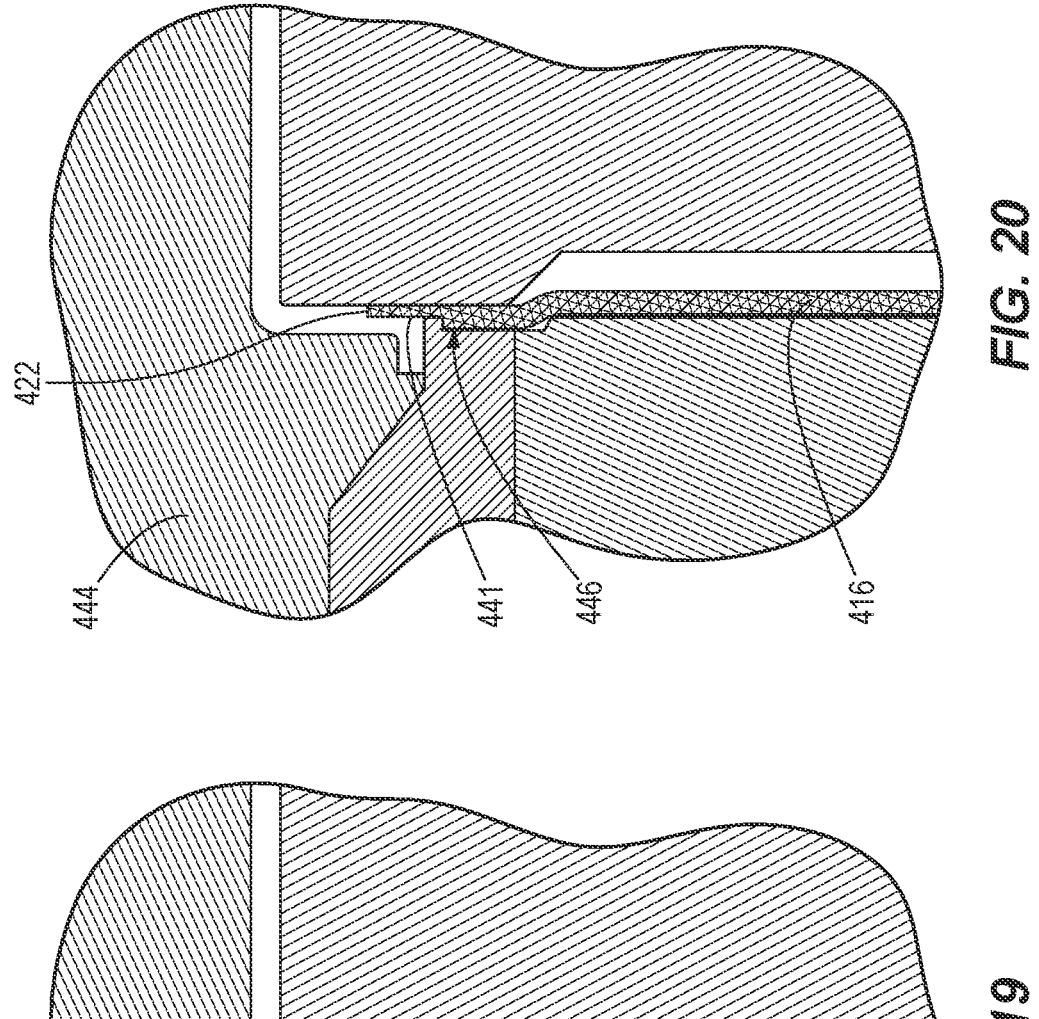
FIG. 19 is a cross-sectional view illustrating a method of manufacturing a filter embodying the invention.
FIG. 20 is a cross-sectional view further illustrating the method of FIG. 19.

FIGS. 19 and 20 illustrate one possible method of attaching the housings 412, 414 (or other housings discussed herein) onto the filter media 416 by overmolding. As shown in FIG. 20, the filter media 416 is placed into the mold 444 over the mold core being provided through the lower end of the filter prior to the lower end being closed. Then, the material of the housings 412, 414 is injected over the filter media 416. In the illustrated method of FIG. 20, the filter media 416 having the reduced thickness 441 at the end 422 is utilized. The mold 444 shuts off or closes against the media 416 at the area 441 of reduced thickness (near area of arrow 446 in FIG. 20). The injected material adheres to the filter media 416 along the area of reduced thickness 441 to attach the filter media 416 to the housings 412, 414. In various alternatives, filter media having end treatment shown in FIGS. 18A, 18B, and 18C may be utilized.

In another alternative, as discussed with reference to FIG. 8C, the filter media 416 may be divided into at least two portions, with the first portion of the filter media 416 being attached to the upper housing 412. Attaching a smaller portion of media to the upper may be useful in handing the filter media in a welding or molding process where internal support is needed. Then, after attachment of the first portion to the upper housing, the second piece of filter media 416' is attached to the first portion of filter media 416 using traditional bonding, sewing, or welding techniques. In one embodiment, not shown, the panel 428 is attached directly to the upper housing by welding, overmolding, adhesive, or other technique, and the filter media 416 is attached to the panel.

Figure 21A:
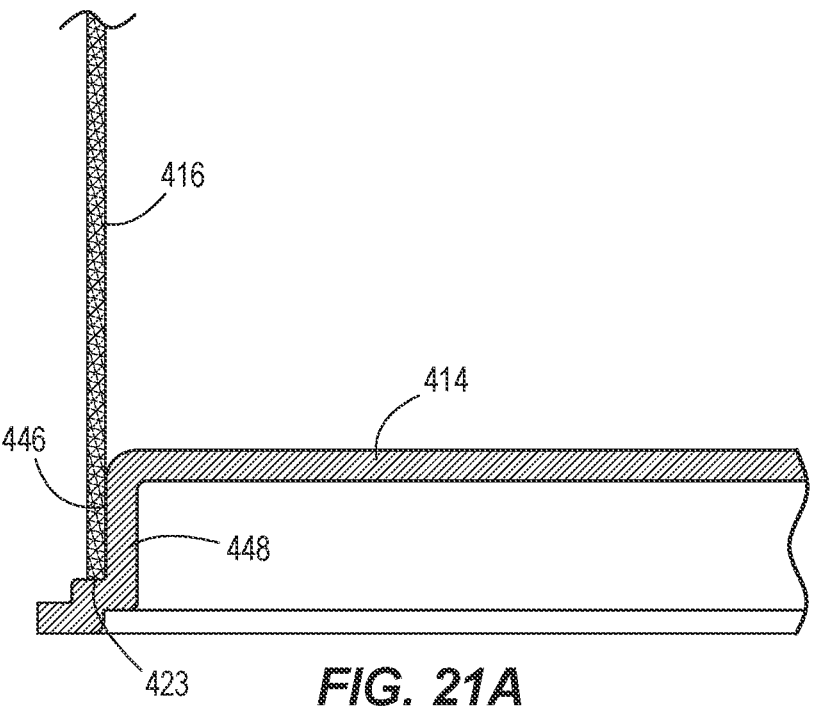
FIG. 21A is a cross-sectional view of a filter according to an embodiment of the invention.
Figure 21B:
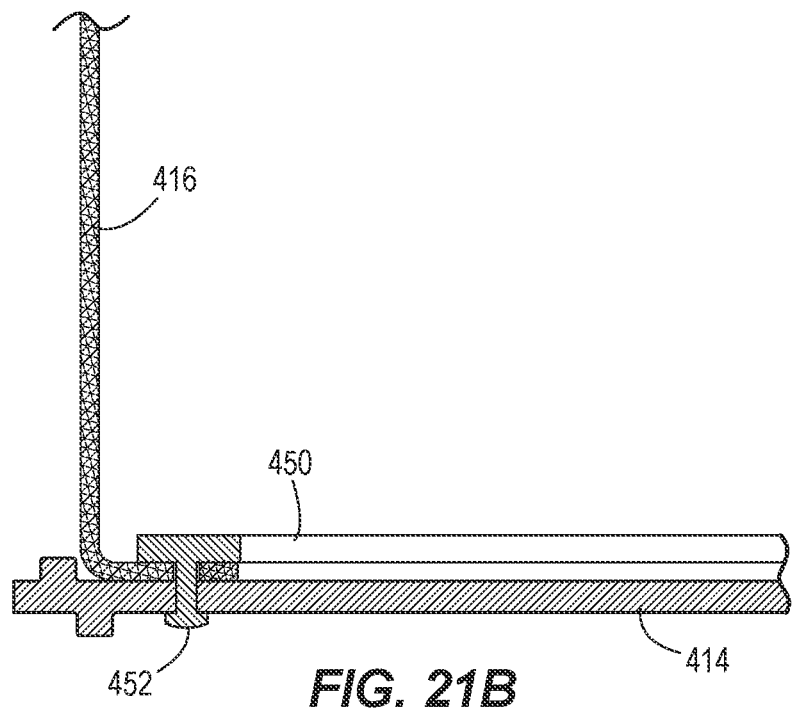
FIG. 21B is a cross-sectional view of a filter according to an embodiment of the invention.

FIG. 21A illustrates a possible way to attach the filter media 416 to the lower housing 414 (or any of the lower housings described herein). In the embodiment of FIG. 21A, the filter media 416 is welded onto an outside surface 446 of a sidewall 448 of the lower housing 414 at the second end 423 of the filter media 416. The filter media 416 can also be attached to the housing 414 using adhesive. FIG. 21B illustrates one possible way to attach the filter media 316 to a flat lower housing 314 (similarly could be used to attach to a flat upper housing 412 or any of the housings described above). A ring 450 optionally having projections 452 may be fitted to capture the lower end of the filter media 416 between the ring and the housing 414 and may be heat staked or otherwise fastened to attach the filter media 416 and the housing 414.

Figure 22:
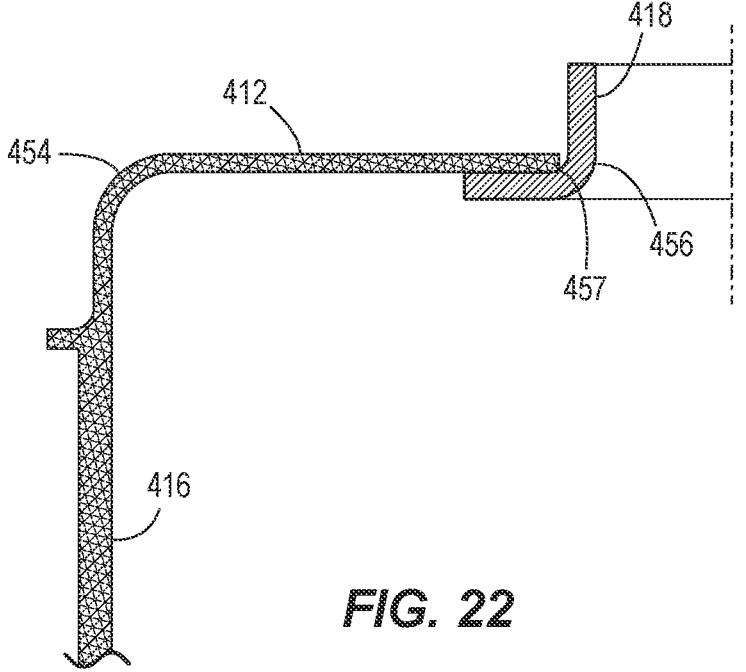
FIG. 22 is a cross-sectional view of a filter according to an embodiment of the invention.

FIG. 22 illustrates an alternative embodiment where a portion 454 of the upper housing 412 is formed by the filter media 416, generally by making the filter media 416 in the portion 454 more rigid or stiffer than the other areas of the filter media 416. The portion 454 is stiffened by compression molding, vacuum thermoforming, or a combination of both, and/or coating/impregnating the portion 454 with thermoset, thermoplastic, or other material to make a rigid or semi rigid upper portion having a desired shape made with the filter media 416. An inlet piece 456, including the inlet opening 418, is inserted through an aperture 457 of the portion 454. The inlet piece 456 can be attached by welding or adhesive. In the illustrated embodiment, the inlet piece 456 is attached to the inside of the portion 454 and in other embodiments, the inlet piece 456 may be attached to the outside of the portion 454. In another embodiment, the inlet piece is overmolded onto the filter media before, during, or after the stiffening operation.

Figure 23:
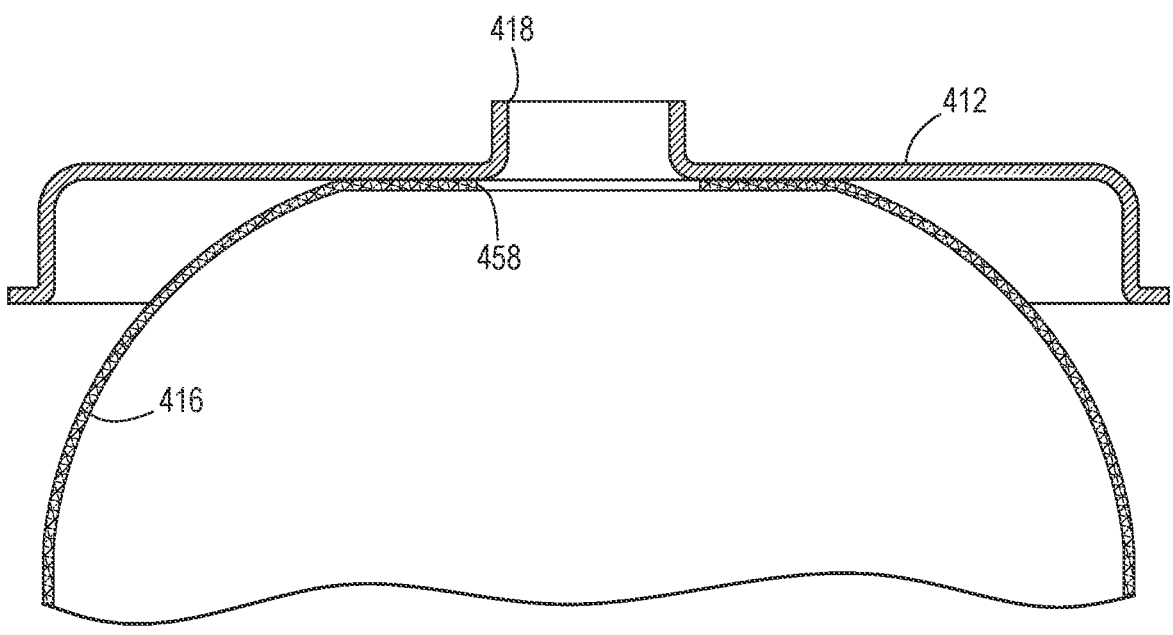
FIG. 23 is a cross-sectional view of a filter according to an embodiment of the invention.

FIG. 23 illustrates an alternative embodiment where the filter media 416 is formed with a generally closed end except for aperture 458. Then, the filter media 416 is attached to the housing 412 with the aperture 458 aligned with the inlet opening 418. The attachment could be made by welding or adhesive around the aperture 458.

Figure 24:
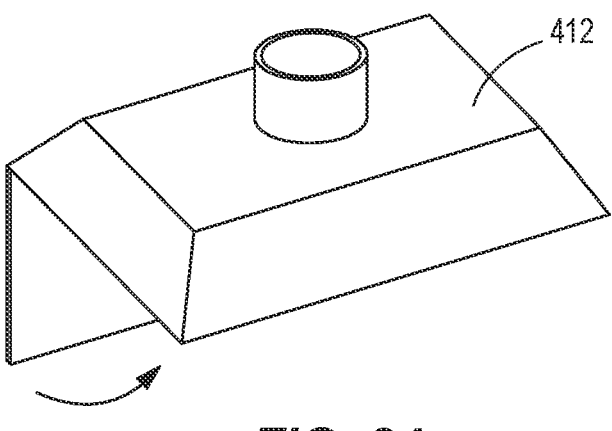
FIG. 24 is a perspective view of a housing for use in a filter embodying the invention.
Figure 25:
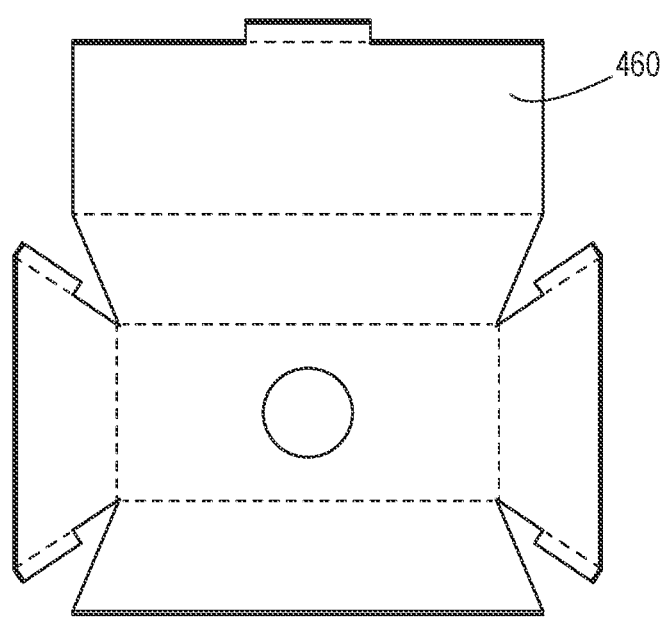
FIG. 25 is a bottom side view of the housing of FIG. 24 before the housing is formed into the position illustrated in FIG. 24.

FIGS. 24 and 25 illustrate an alternative embodiment where the housing 412 or housing 414 are formed by folding a die cut shape 460 (FIG. 25). The shape 460 is die cut and then folded to create the housing 412 or 414. The filter media can be attached to the housings 412 or 414 by welding or adhesive. In other embodiments, the housing can be formed from a single piece hinged from a top piece. The top and bottom die cut pieces could be separated and then bonded to each other or separately to the filter media by the methods previously discussed.

Figure 26:
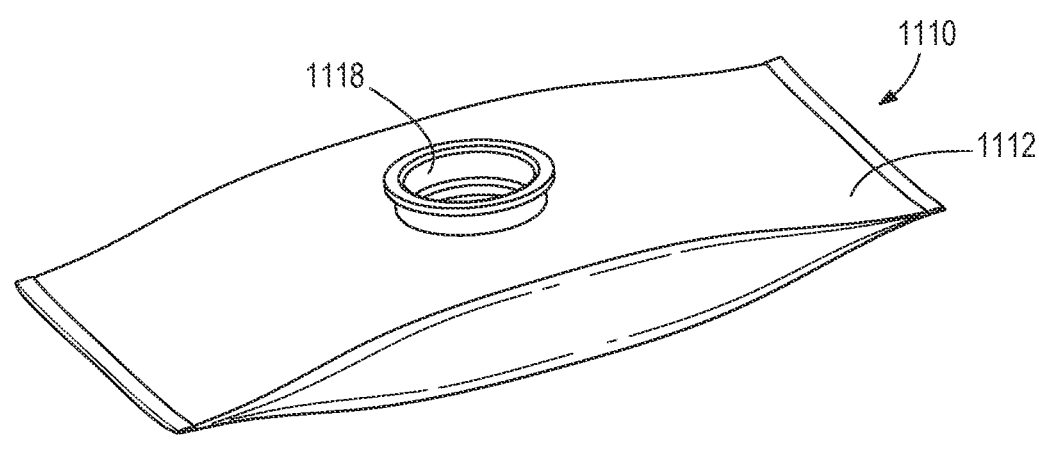
FIG. 26 is a perspective view of a filter according to an embodiment of the invention with the filter media in a collapsed position.
Figure 27:
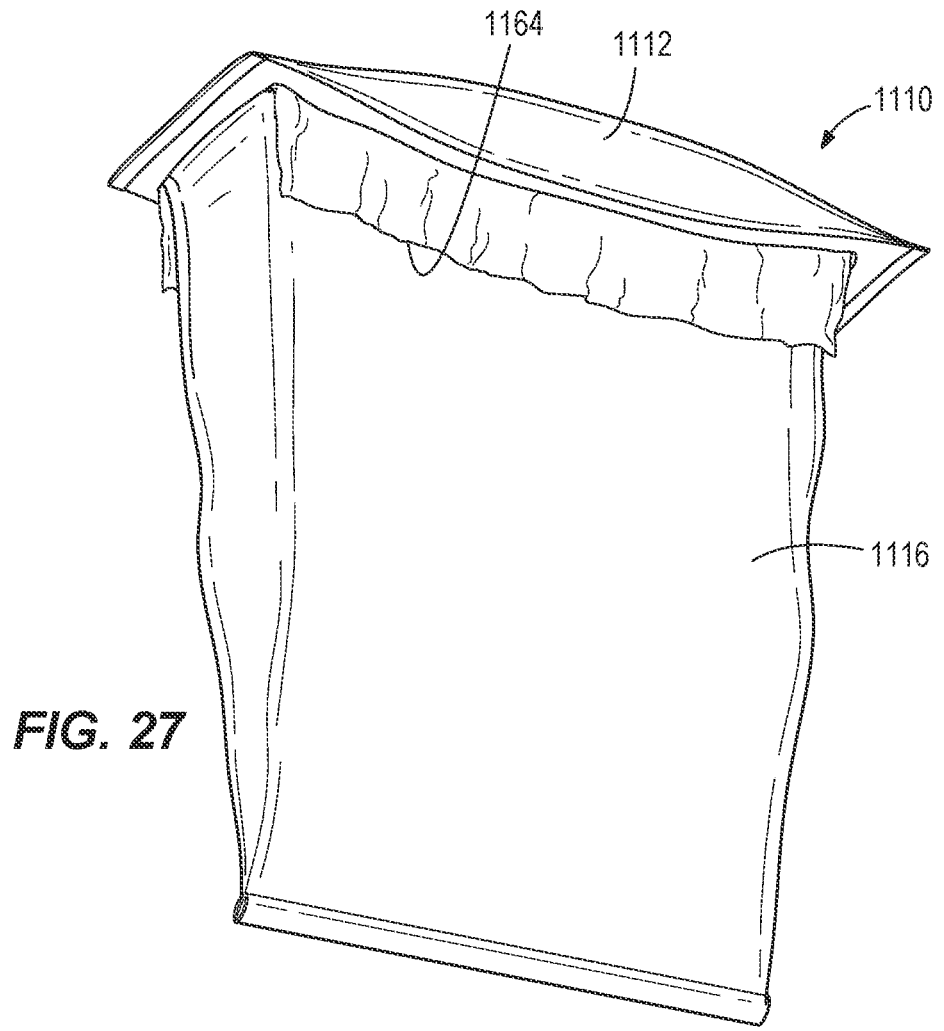
FIG. 27 is a perspective view of the filter of FIG. 36 illustrating the filter media in an expanded position.

FIGS. 26 and 27 illustrate a filter 1110 according to another embodiment. The filter 1110 includes features similar to the filters discussed above and only some differences between the filters will be discussed. The filter 1110 includes an upper housing 1112 that includes a bag 112. In one embodiment, filter media 1116 is formed as a complete enclosure with a desired inlet 1118. The filter media is compacted and inserted into an open end of the bag 1112 and then the bag sealed, or alternatively, the bag 1112 formed and sealed around the compacted media. Optionally, the bag 1112 is attached to the filter material around the inlet 1118. The bag 1112 can be formed from foil, plastic, paper, or other suitable materials. The bag 1112 includes a tear-out bottom 1164 opposite the inlet 1118 at the top of the bag 1112. In some applications, the bag 1112 is installed into the device with the filter media 1116 in the collapsed position (FIG. 26). Then, when the device is used or turned on, the filter media 1116 automatically breaks through the bottom 1164 of the bag 1112 because of the airflow through the inlet 1118. Alternatively, the bag includes a portion that the user opens before loading into a device, such as a tear-away portion, tear or cut line, or other opening. In yet another alternative, a mechanism may be used to push or pull one end of the filter away from the other moving the filter to the expanded position.

Figure 28:
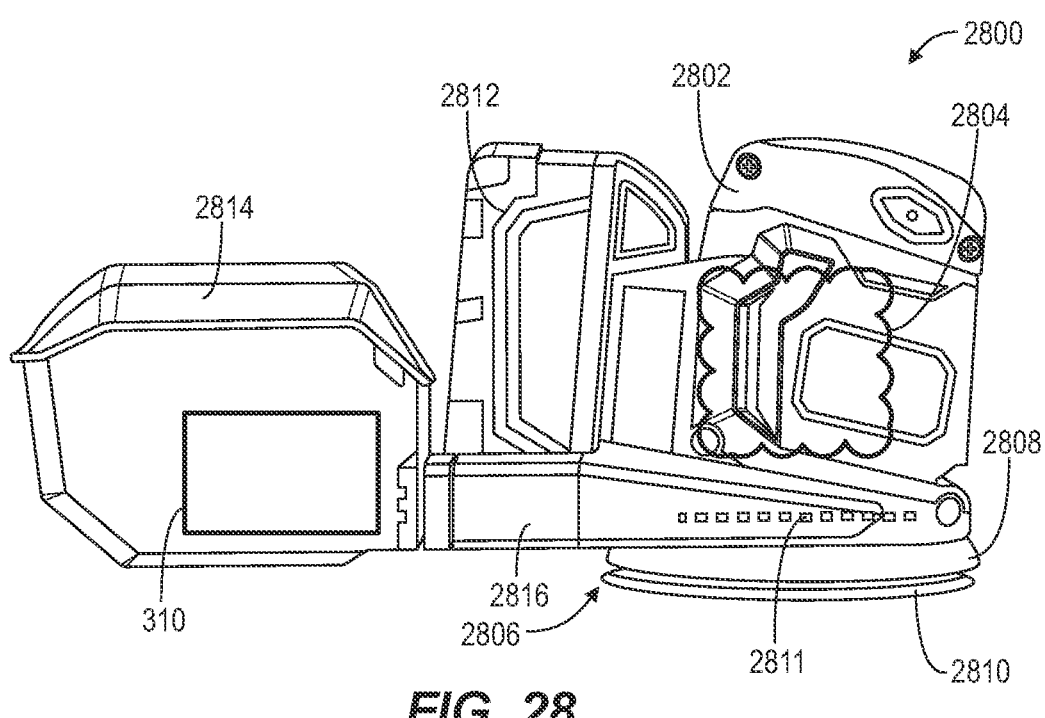
FIG. 28 is a side view of a power tool including a filter and dust collector embodying the invention.

FIG. 28 illustrates a power tool 2800. The power tool 2800 in the illustrated embodiment is a sander. The sander 2800 includes a housing 2802, a motor 2804 inside the housing 2802, and a tool 2806. In the illustrated embodiment, the tool 2806 includes a pad 2808 and a sheet of sand paper 2810 removably coupled to the pad 2808. The sander 2800 further includes a battery 2812 that provides power to the motor 2804. The sander 2800 further includes a dust collector housing 2814 and a duct 2816 that provides fluid communication into the dust collector housing 2814. In one embodiment, the sander 2800 includes a fan 2811 inside the housing 2802 and adjacent the pad 2808. The fan 2811 is in fluid communication with the duct 2816 and the fan blows dust and debris into the dust collector housing 2814 through the duct 2816. Any one of the filters 310, 410, 510, 610, 710, 810, 910, 1010, 1110, discussed above, can be located inside the dust collector housing 2814 and in fluid communication with the duct 2816. Although the illustrated sander 2800 is a random orbit sander, the filters 310, 410, 510, 610, 710, 810, 910, 1010, 1110, discussed above, can be used with other types of sanders, including belt sanders, orbital sanders, spindle sanders, drum sanders, and the like.

In operation, the motor 2804 rotates the pad 2808 and the sand paper 2810 to sand a workpiece (e.g., wood), which creates dust. The dust is blown by the fan through the duct 2816 and into the filter (e.g., filter 310) inside the dust collector housing 2814. The filter 310 separates the dust from the air flow and the dust is retained in the filter 310 while the relatively clean air is exhausted from the filter 310 and the dust collector housing 2814. When the filter 310 is full, the user removes and replaces the filter 310 with a new filter 310. As discussed above, in one embodiment, the filter 310 includes a valve 319 that is automatically closed when the filter 310 is removed from the duct 2816 to inhibit the dust from escaping the filter 310 after the filter 310 is removed.

Figure 29:
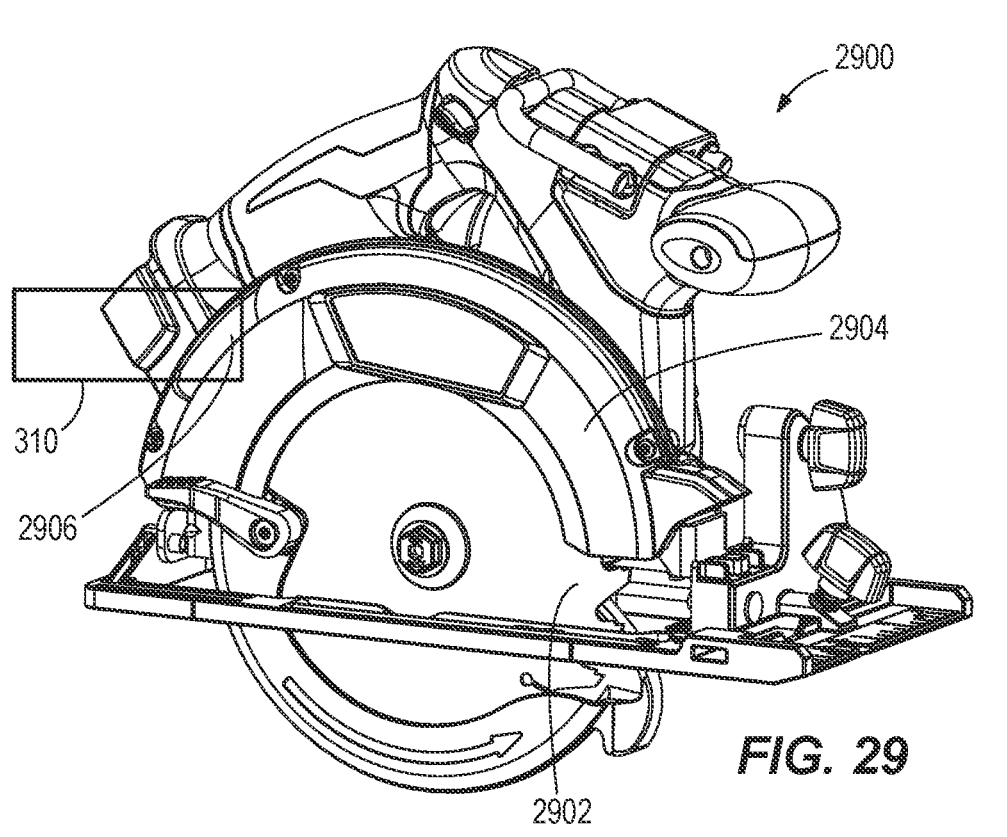
FIG. 29 is a perspective view of a power tool including a filter and dust collector embodying the invention.

FIG. 29 illustrates another example of a power tool 2900 that can utilize any one of the filters 310, 410, 510, 610, 710, 810, 910, 1010, 1110, discussed above. In the illustrated embodiment, the power tool 2900 is a circular saw that includes a saw blade 2902. The saw 2900 further include a guard 2904 that partially surrounds the blade 2902. The guard 2904 defines a duct that includes a discharge 2906. The filter (e.g., filter 310) can be coupled to the discharge 2906 so that the filter 310 receives debris, dust, and air flow from the discharge 2906. In operation, rotation of the saw blade 2902 generates an air flow in the guard 2904 that propels dust and debris through the discharge 2906 and into the filter 310. When the filter 310 is full, the user removes and replaces the filter 310 with a new filter 310. The filter 310 separates the dust and debris (e.g., saw dust, wood chips, etc.) from the air flow and the debris and dust is retained in the filter 310 while the relatively clean air is exhausted from the filter 310. As discussed above, in one embodiment, the filter 310 includes a valve 319 that is automatically closed when the filter 310 is removed from the discharge 2906 to inhibit the dust from escaping the filter 310 after the filter 310 is removed.

Figures 30, 31:
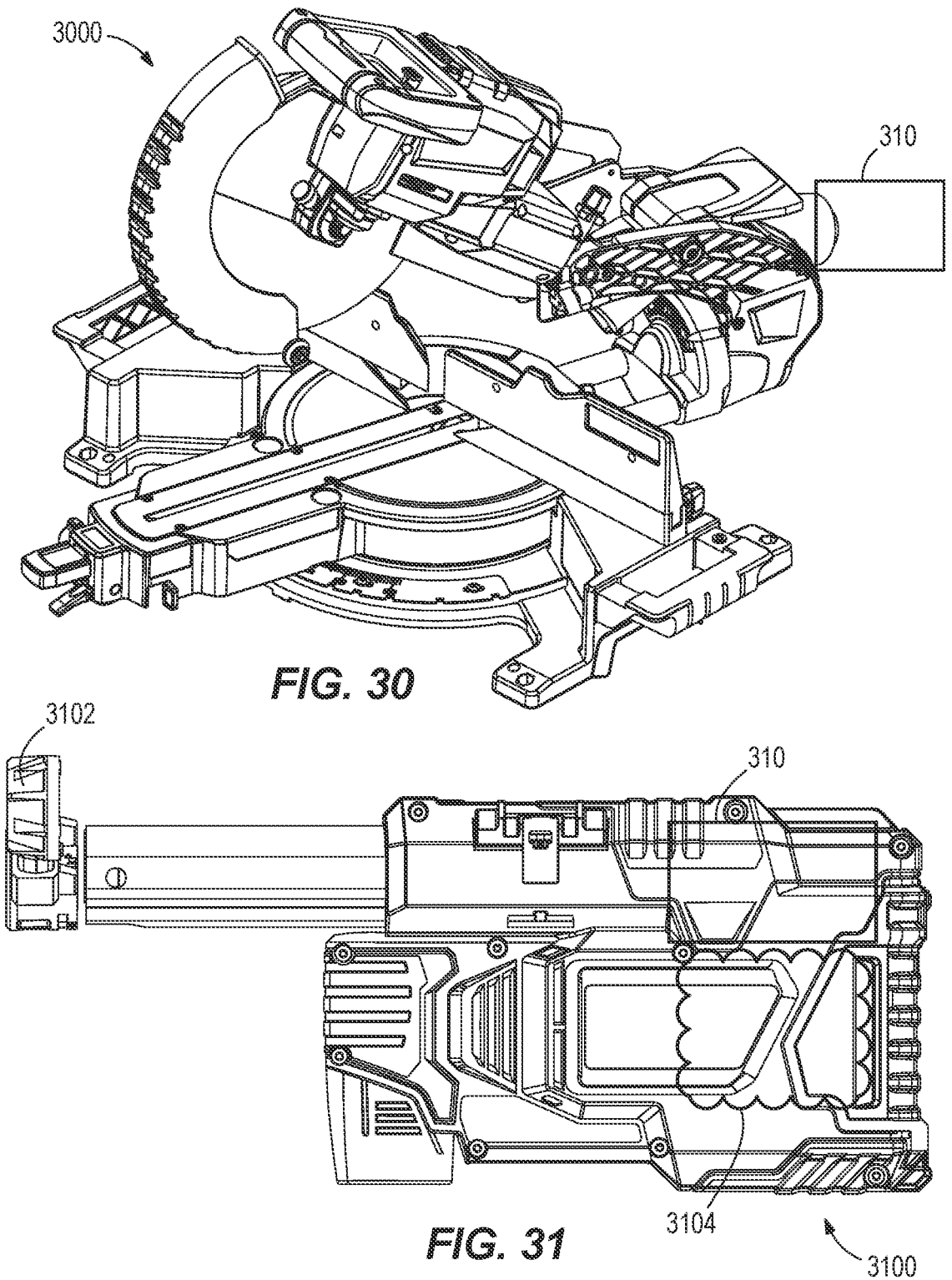
FIG. 30 is a perspective view of a power tool including a filter and dust collector embodying the invention.
FIG. 31 is a side view of a power tool including a filter and dust collector embodying the invention.

Although the saw 2900 is a circular saw, the filters 310, 410, 510, 610, 710, 810, 910, 1010, 1110, discussed above, can be used with other types of saws. For example, FIG. 30 illustrates a miter saw 3000 that includes a filter (e.g., filter 310) that separates and stores debris and dust generated by the saw 3000. In yet other embodiments, other suitable types of saws can include the filters 310, 410, 510, 610, 710, 810, 910, 1010, 1110, discussed above, including table saws, reciprocating saws, band saws, jig saws, reciprocating saws and the like.

FIG. 31 illustrates another type of power tool 3100 that can include one of the filters 310, 410, 510, 610, 710, 810, 910, 1010, 1110, discussed above. In the illustrated embodiment, the power tool 3100 is a dust extractor that is attached to a drill, including a hammer drill. Although the illustrated dust extractor 3100 is a universal dust extractor that can be attached to other drills, in other embodiments, the dust extractor can be an extractor that is dedicated for use with a single drill. The dust extractor 3100 includes a nozzle 3102 and a suction source (e.g., motor and fan) 3104 in fluid communication with the nozzle 3102. In operation, the dust extractor 3100 is attached to a drill. The drill includes a drill bit that creates dust or debris. The dust/debris is drawn through the nozzle 3102 by the suction source 3104 and into the filter 310. The filter 310 separates the dust from the air flow and the dust is retained in the filter 310 while the relatively clean air is exhausted from the filter 310 and travels through the suction source 3104 before being exhausted. When the filter 310 is full, the user removes and replaces the filter 310 with a new filter 310. As discussed above, in one embodiment, the filter 310 includes a valve 319 that is automatically closed when the filter 310 is removed to inhibit the dust from escaping the filter 310 after the filter 310 is removed. Although the illustrated dust extractor 3100 is configured for use with a drill, in other embodiments, the dust extractor can be configured for use with other types of power tools, including a grinder.

Figure 32:
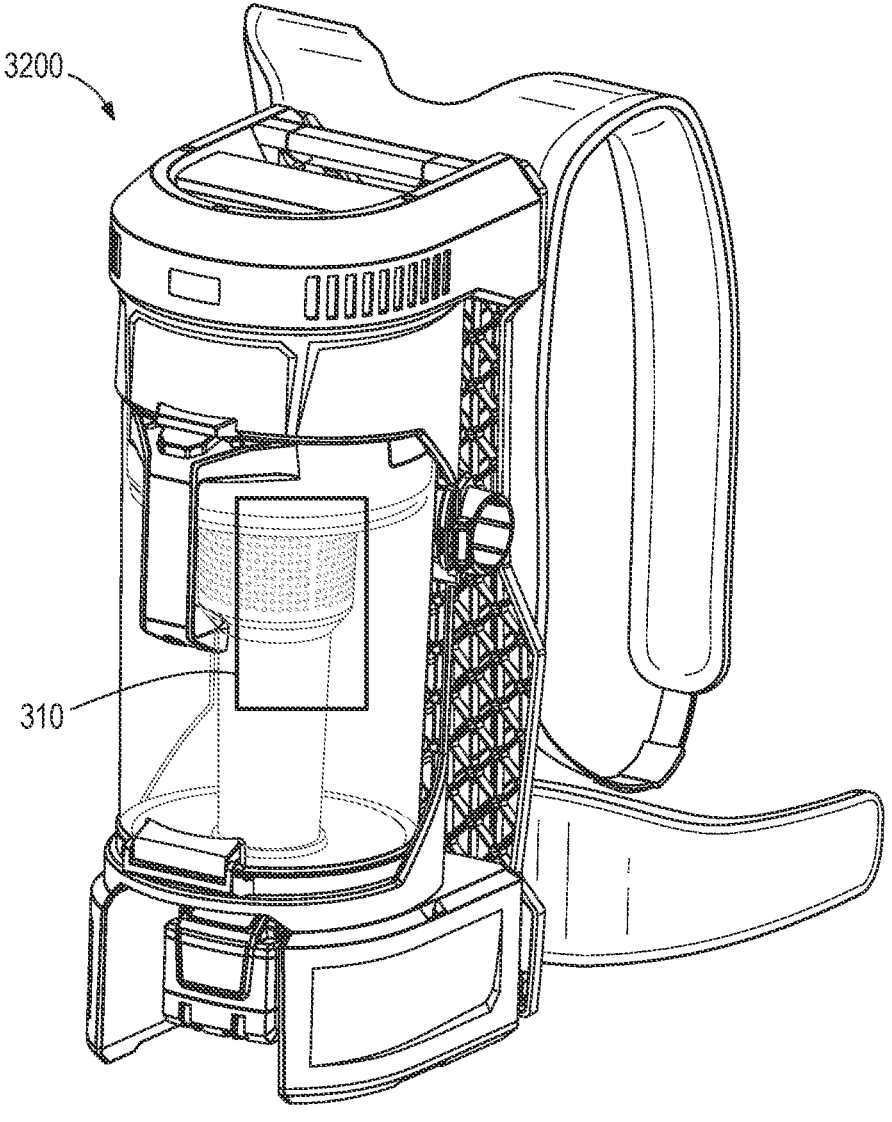
FIG. 32 is a perspective view of a power tool including a filter and dust collector embodying the invention.

FIG. 32 illustrates another type of power tool 3200 that can include one of the filters 310, 410, 510, 610, 710, 810, 910, 1010, 1110. The illustrated power tool 3200 is a vacuum cleaner, particularly a battery powered backpack vacuum cleaner. In other embodiments, the vacuum cleaner 3200 can be another type of vacuum cleaners, including a wet/dry vacuum cleaner.

The filters 310, 410, 510, 610, 710, 810, 910, 1010, 1110 have bene found to be particularly beneficial for use in power tools. On worksites, use of power tools may produce dust, e.g., silica dust, or other particles that can become airborne and it may be advantageous to capture the dust. Then, upon capture, it may be advantageous to prevent exposure of the captured dust to users. Therefore, the filters (e.g., filter 310 that closes when removed) may provide for convenient disposal of captured dust without exposing the user to the captured dust when changing the filter.

Figures 33, 34:
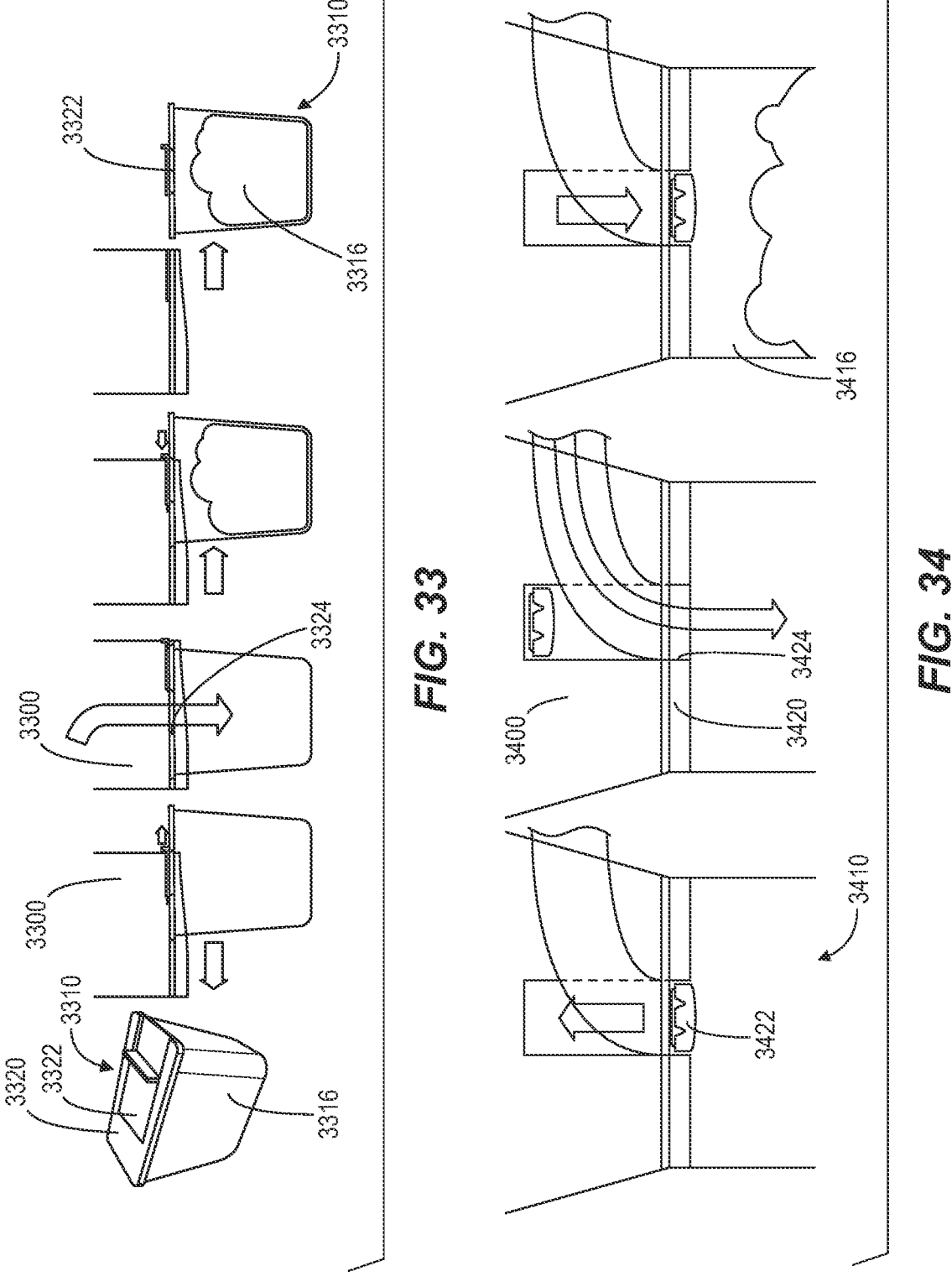
FIG. 33 illustrates a filter for use with a power tool according to another embodiment of the invention.
FIG. 34 illustrates a filter for use with a power tool according to another embodiment of the invention.

FIG. 33 illustrates a filter 3310 according to another embodiment that can be used with a power tool 3300. The filter 3310 includes filter media 3316 and a housing 3320. As discuss above, in some embodiments, the filter media 3316 is collapsible into the housing 3320 when the filter 3310 is empty and the filter media 3316 automatically expands when in use. Also, as discussed above, the filter 3310 defines an inner volume that receives debris and an airflow. The filter media 3316 filters the airflow while the debris remains inside the filter 3310. The housing 3320 includes a valve or door 3322 and an opening 3324. The door 3322 is biased (e.g., spring biased) to a closed position to cover the opening 3324 when the filter 3310 is not attached to the power tool 3300. As illustrated in FIG. 33, as the filter 3310 is attached to the power tool 3300, the door 3322 is automatically opened so that the opening 3324 is in fluid communication with a debris outlet of the power tool 3300. When the filter 3310 is full, the filter 3310 is removed and the door 3322 automatically closes to minimize the risk of any debris escaping the filter 3310.

FIG. 34 illustrates a filter 3410 according to another embodiment that can be used with a power tool 3400. The filter 3410 includes filter media 3416 and a housing 3420. As discussed above, in some embodiments, the filter media 3416 is collapsible into the housing 3420 when the filter 3410 is empty and the filter media 3416 automatically expands when in use. Also, as discussed above, the filter 3410 defines an inner volume that receives debris and an airflow. The filter media 3416 filters the airflow while the debris remains inside the filter 3410. The housing 3420 includes a valve 3422 and an opening 3424. The valve 3422 is received in the opening 3424 to cover the opening 3424 to inhibit debris from exiting the filter 3410 through the opening 3424. As illustrated in FIG. 34, when the filter 3410 is attached to the power tool 3400, the valve 3422 is removed from the opening 3424 to a position outside of the filter 3410 and outside of the flow path of debris and air into the filter 3410. This allows the debris and the airflow to pass into the filter 3410 through the opening 3424. When the filter 3410 is full, the valve 3422 is closed or moved back to the position where the valve 3422 is received in the opening 3424 and the filter 3410 is removed from the power tool 3400. In some embodiments, the valve 3422 automatically moves between the opened and closed positions when the filter 3410 is attached and detached from the power tool 3400. In other embodiments, the power tool 3400 includes an actuator that the user uses to open and close the valve 3410 manually.

Figures 35, 36:
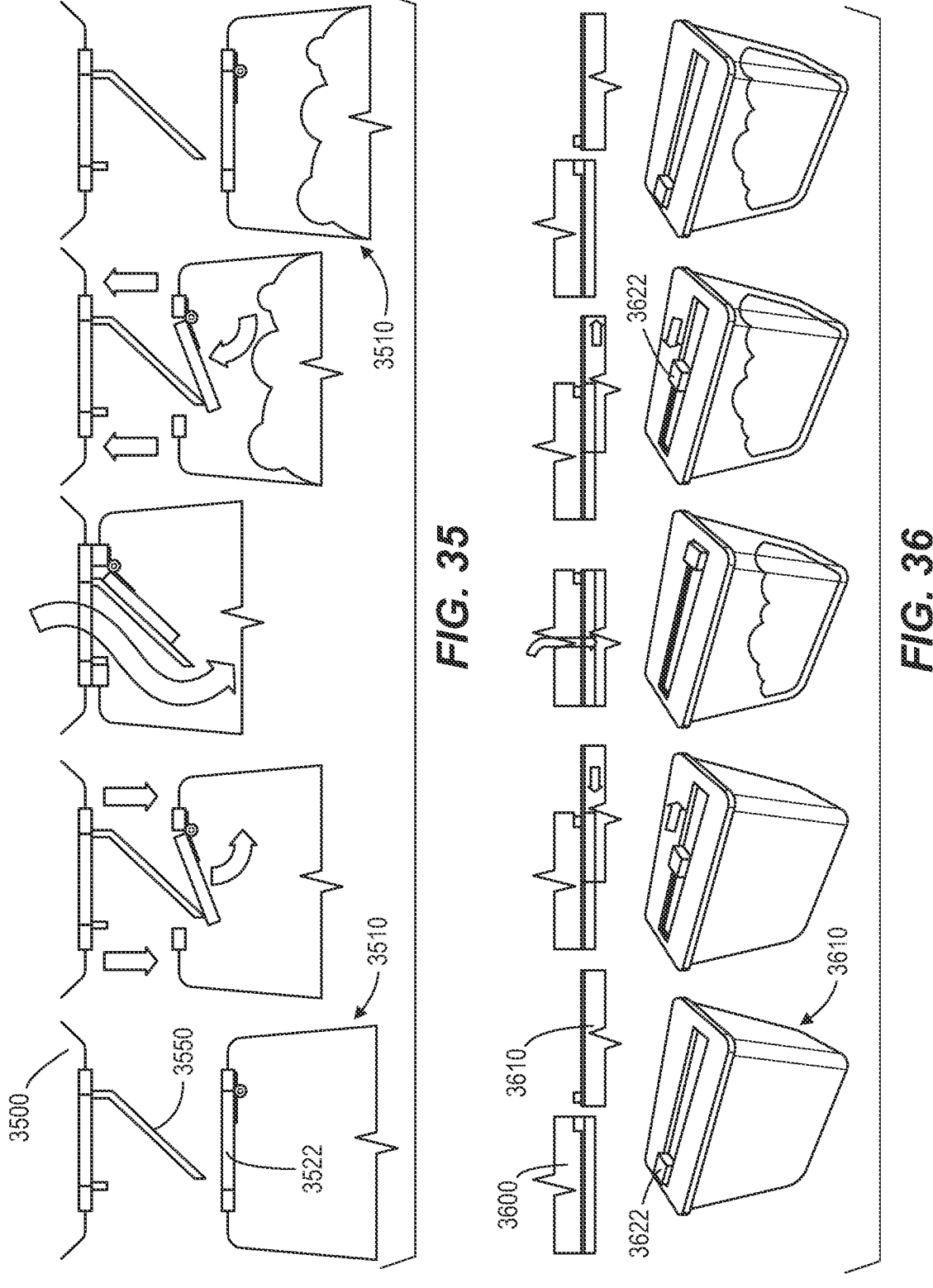
FIG. 35 illustrates a filter for use with a power tool according to another embodiment of the invention.
FIG. 36 illustrates a filter for use with a power tool according to another embodiment of the invention.

FIG. 35 illustrates a filter 3510 according to another embodiment that can be used with a power tool 3500. The filter 3510 includes some features similar to the filters discussed above and therefore only some of the differences between the filters will be discussed. The filter 3510 includes a door or valve 3522 that is biased to a closed position (e.g., spring biased). The power tool 3500 includes a projection 3550 that in the illustrated embodiment forms a portion of the duct that transports debris and the airflow into the filter 3510. When the filter 3510 is attached to the power tool 3500, the projection 3550 contact the valve 3522 and opens the valve 3522. The filter 3510 can then receive debris and the airflow from the power tool 3500. When the filter 3510 is detached from the power tool 3500, the valve 3522 automatically moves back to the closed position.

FIG. 36 illustrates a filter 3610 according to another embodiment that can be used with a power tool 3600. The filter 3610 includes some features similar to the filters discussed above and therefore only some of the differences between the filters will be discussed. The filter 3610 includes a re-sealable zipper 3622 that opens and closes the filter 3610. When the filter 3610 is attached to the power tool 3600, the zipper 3622 is automatically moved to the open position in response to the action attaching the filter 3610 to the power tool 3600. This places the filter 3610 in fluid communication with a debris outlet of the power tool 3600 and the filter 3610 can receive debris and an airflow from the power tool 3600. When the filter 3610 is detached from the power tool 3600, the zipper 3622 automatically moves to the closed position in response to the action of removing the filter 3610 from the tool 3600.

Figures 37, 38:
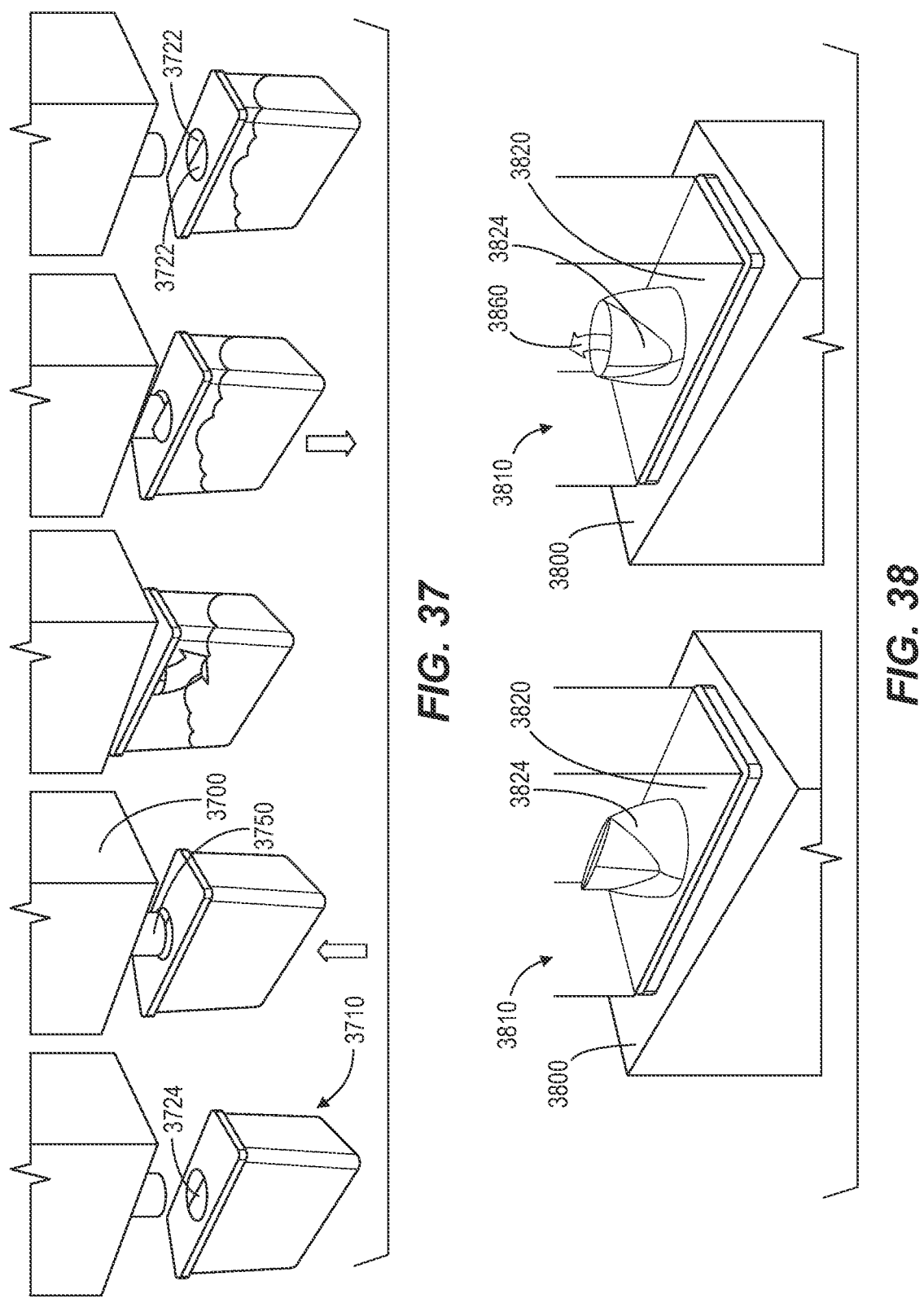
FIG. 37 illustrates a filter for use with a power tool according to another embodiment of the invention.
FIG. 38 illustrates a filter for use with a power tool according to another embodiment of the invention.

FIG. 37 illustrates a filter 3710 according to another embodiment that can be used with a power tool 3700. The filter 3710 includes some features similar to the filters discussed above and therefore only some of the differences between the filters will be discussed. The filter 3710 includes elastic (e.g., rubber) flaps 3722 that cover an opening 3724. The power tool 3700 includes a projection 3750 that in the illustrated embodiment forms a portion of the duct that transports debris and the airflow into the filter 3710. When the filter 3710 is attached to the power tool 3700, the projection 3750 separates the flaps 3722 allowing the projection 3750 to pass into the filter 3710 and placing the debris outlet of the power tool 3700 in fluid communication with the filter 3710. The flaps 3722 also create a seal around the debris outlet or projection 3750. When the filter 3710 is detached from the power tool 3700, the flaps 3722 automatically move back into a closed position to cover the opening 3724 to inhibit debris from exiting the filter 3710 through the opening 3724.

FIG. 38 illustrates a filter 3810 according to another embodiment that can be used with a power tool 3800. The filter 3810 includes some features similar to the filters discussed above and therefore only some of the differences between the filters will be discussed. The filter 3810 includes a one-way valve 3824. In one embodiment, the valve 3824 is a duckbill type check valve. The valve 3824 automatically opens in response to an airflow passing through the valve 3824 or in response to the filter 3810 being at a lower pressure (e.g., vacuum) than outside the housing 3820 of the filter 3810. This allows the airflow and debris to pass into the filter 3810, which is represented by arrow 3860 in FIG. 38. When the airflow stops or when the filter 3810 is no longer at a lower pressure (e.g., when the power tool 3800 is turned off), the valve 3824 automatically moves back to a closed position to inhibit debris from exiting the filter 3810, particularly when the filter 3810 is detached from the power tool 3800.

Figures 39, 40:
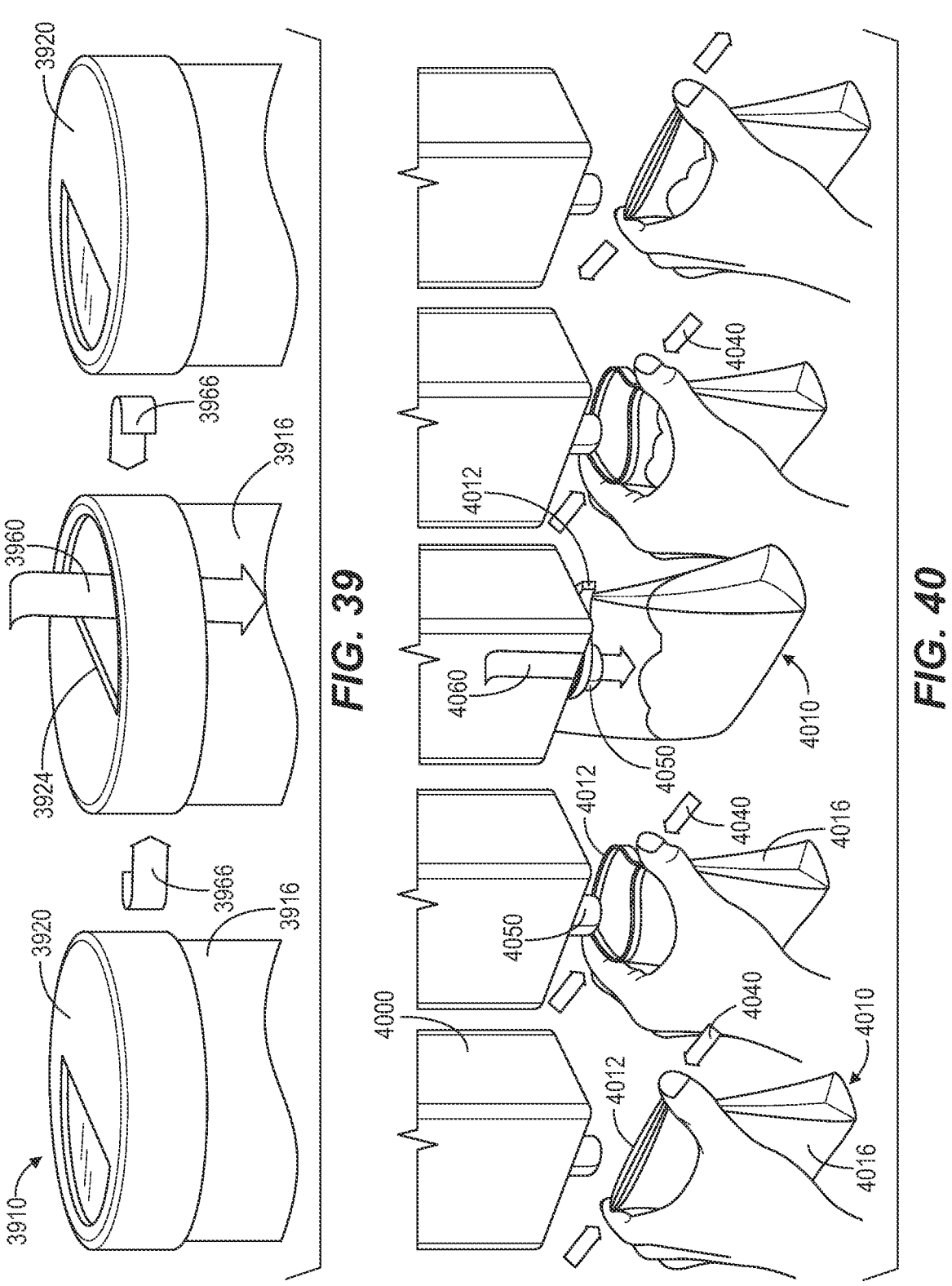
FIG. 39 illustrates a filter for use with a power tool according to another embodiment of the invention.
FIG. 40 illustrates a filter for use with a power tool according to another embodiment of the invention.

FIG. 39 illustrates a filter 3910 according to another embodiment that can be used with a power tool. The filter 3910 includes some features similar to the filters discussed above and therefore only some of the differences between the filters will be discussed. The filter 3910 includes a housing 3920 that is rotatable relative to filter media 3916 as represented by arrows 3966. After the filter 3910 is attached to the power tool, the housing 3920 is rotated, about a half turn in one embodiment, which exposes an opening 3924. With the opening 3924 exposed or opened, airflow and debris from the power tool passes into the filter 3910 as represented by the arrow 3960 in FIG. 39. To remove or detach the filter 3910 from the power tool, the housing 3920 is first rotated back to cover the opening 3924 and close the filter 3910. Then, the filter 3910 is detached from the power tool with the opening 3924 closed or covered to inhibit debris from exiting the filter 3910.

FIG. 40 illustrates a filter 4010 according to another embodiment that can be used with a power tool 4000. The filter 4010 includes some features similar to the filters discussed above and therefore only some of the differences between the filters will be discussed. The filter 4010 includes a spring biased closure 4012 that is attached to filter media 4016. In one embodiment the spring biased closure 4012 includes a spring steel. As illustrated in FIG. 40, the closure 4012 is pinched inward in the direction of arrows 4040 in FIG. 40 against the spring bias to open the filter 4010. With the filter 4010 opened, a debris discharge 4050 of the power tool 4000 is inserted into the filter 4010. The closure 4012 is released and the spring bias automatically closes the closure 4012 around the debris discharge 4050 and creating a seal around the debris discharge 4050. Air and debris can pass into the filter as represented by arrow 4060. To detach or remove the filter 4010, the user pinches the closure 4012 inward in the direction of arrows 4040 to release the closure 4012 from the debris discharge 4050. When the filter 4010 is removed, the user releases the closure 4012 and the closure 4012 seals the filter 4010 closed to inhibit debris from exiting the filter 4010.

Figures 41, 42:
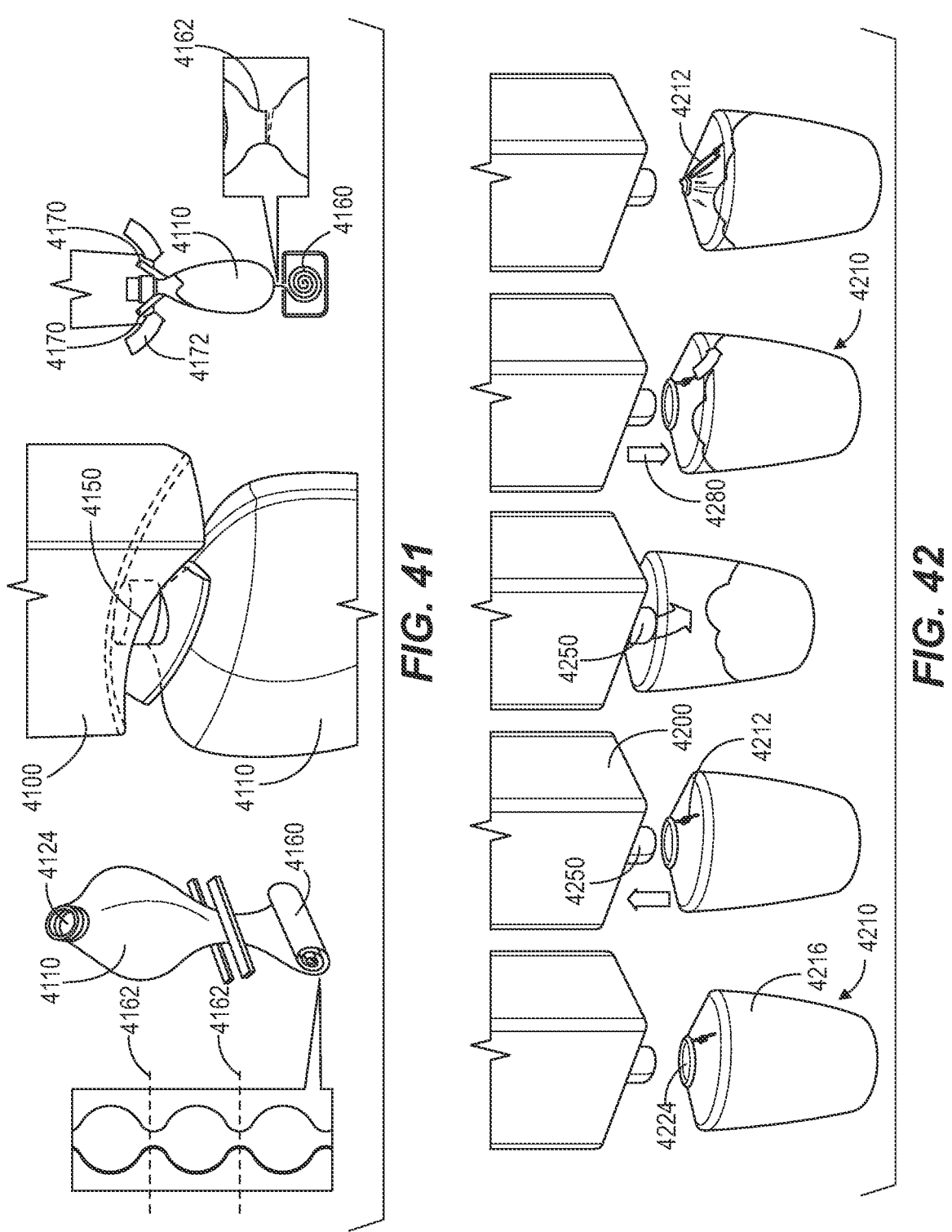
FIG. 41 illustrates a filter for use with a power tool according to another embodiment of the invention.
FIG. 42 illustrates a filter for use with a power tool according to another embodiment of the invention.

FIG. 41 illustrates a filter 4110 according to another embodiment that can be used with a power tool 4100. The filter 4110 includes some features similar to the filters discussed above and therefore only some of the differences between the filters will be discussed. The filter 4110 is supplied on a roll 4160 having multiple filters with perforations 4162 between each filter 4110. Tearing or removing an adjacent filter at a perforation 4162 creates an opening 4124. The opening 4124 is placed around or otherwise in fluid communication with debris discharge 4150 of the power tool 4100 so that the filter 4110 can receive an airflow with debris from the power tool 4100. When the filter is full, heating elements 4170 clamp onto the filter 4110 (as represented by arrows 4172) to seal the filter 4110 closed and seal the opening 4124 closed. The full filter 4110 is then torn from the roll 4160 at the next perforation 4162 and a new filter 4110 is loaded or installed as discussed above.

FIG. 42 illustrates a filter 4210 according to another embodiment that can be used with a power tool 4200. The filter 4210 includes some features similar to the filters discussed above and therefore only some of the differences between the filters will be discussed. The filter 4210 includes filter medial 4216 and an opening 4224. The filter 4210 further includes a closure 4212 around the opening 4224. In the illustrated embodiment, the closure 4212 includes a drawstring. The user attaches the filter 4210 to the power tool 4200 by inserting the debris outlet 4250 of the tool 4200 through the opening 4224. Then, the user pulls the drawstring closure 4212 to seal the filter 4210 to the debris outlet 4250 and further secure the filter 4210 to the tool 4200. When the filter 4210 is full, the user pulls the filter 4210 from the debris outlet 4250 as represented by arrow 4280. The user then further pulls the drawstring closure 4212 to close the opening 4224 and seal the filter 4210 closed to inhibit debris from escaping the filter 4210. In other embodiments, the closure 4212 can includes a self-clinching rubber band.

In some embodiments, the filters and/or power tool may include devices that indicate to the user when the filter is full and needs replacement. For example, in one embodiment, the power tool and/or filter includes a viewing window that provides the user a visual indication that the filter is full. The viewing window could include a see through strip on the filter, a translucent or transparent filter media, or a clear bottom housing that rotates to be become the side of the filter as the filter fills. In another embodiment, the device may include a pop-up type indicator, a mechanical limit switch, a Hall Effect sensor, a pressure sensor, or a force transducer that measures the force of the filter against a wall. In some embodiments, the handle of the power tool provides haptic feedback to the user that the filter is full. In some embodiments, the tool may include an access window or area for the user to touch the filter to sense the fill level by touch.

Figure 43:
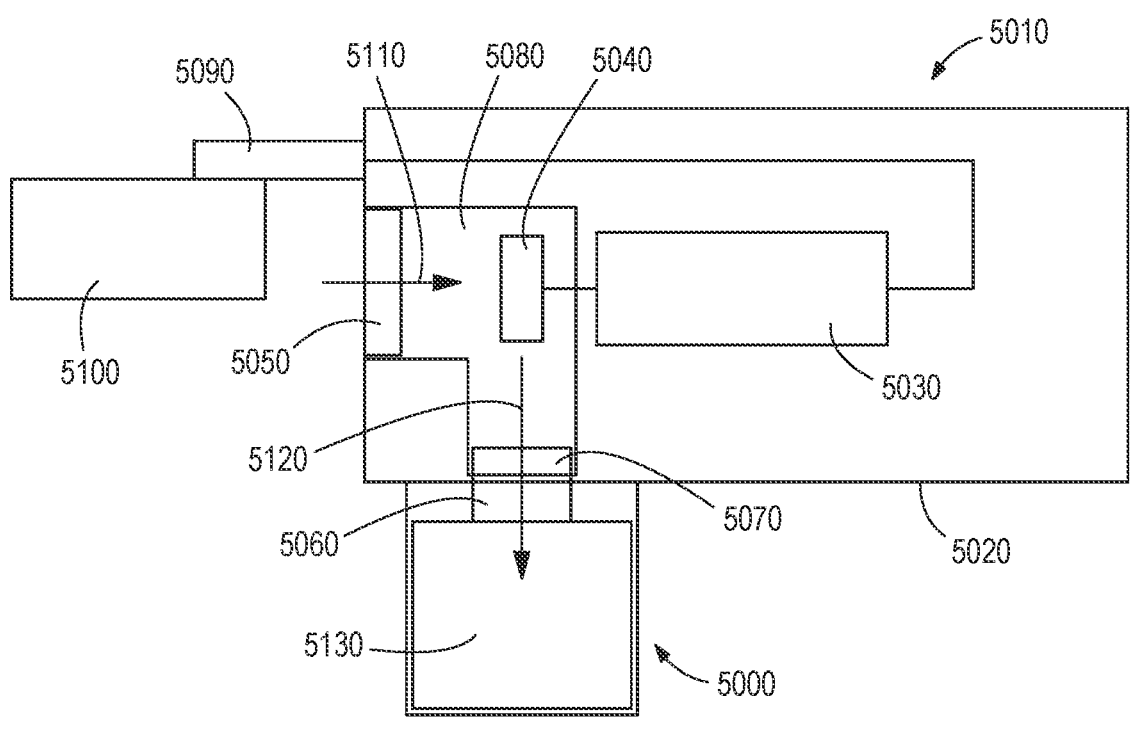
FIG. 43 schematically illustrates a power tool having a filter with a dirty air system arrangement.
Figure 44:
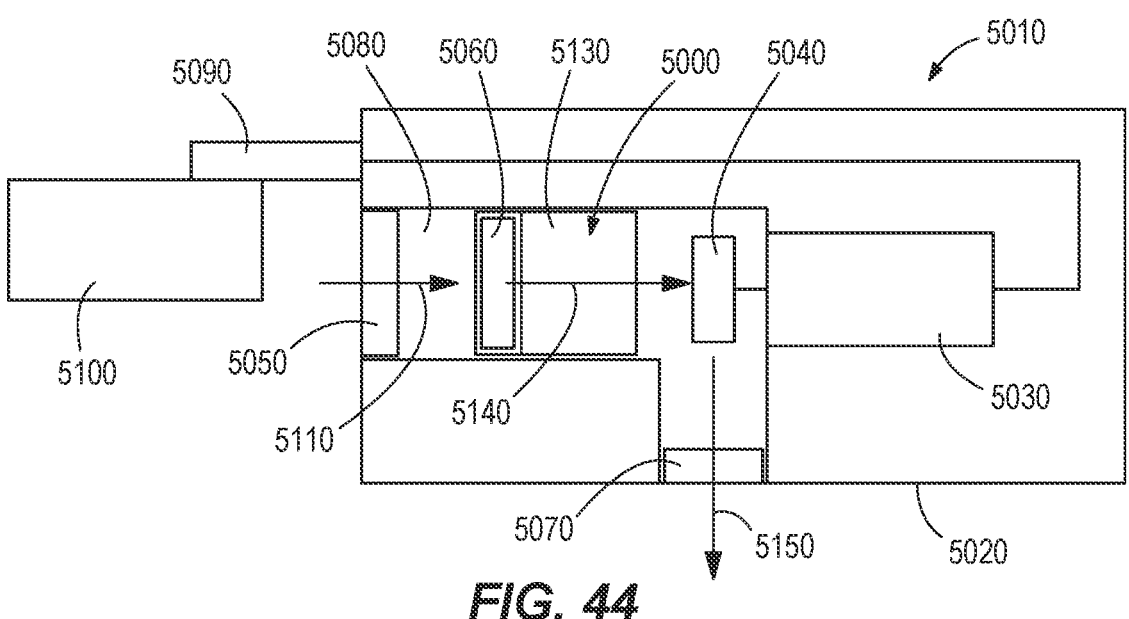
FIG. 44 schematically illustrates a power tool having a filter with a clean air system arrangement.

FIGS. 43 and 44 illustrate two different ways of implementing a filter 5000 with a power tool 5010 having a power tool housing 5020 supporting a motor 5030 to rotate a fan 5040 to pull the fluid flow with debris through a fluid inlet 5050 on the housing 5020. Specifically, FIG. 43 illustrates a "dirty air system," in which fluid flow with debris moves through the fan 5040, and FIG. 44 illustrates a "clean air system," in which the fluid flow moving through the fan 5040 is substantially free of debris, because the debris has been filtered out of the fluid flow by the filter 5000, which is arranged upstream of the fan 5040. Depending on the type of filter 5000 and power tool 5010 used, and depending on whether the system is a dirty air system or clean air system, the filter 5000 could be one of the filters previously described in this application, and the power tool 5010 could be one of the power tools previously described in this application.

In the dirty air system of FIG. 43, the filter 5000 is attached to the power tool housing 5020 such that a filter opening 5060 is aligned with a discharge outlet 5070 on the power tool housing 5020. The discharge outlet 5070 is in fluid communication with the fluid inlet 5050 via a conduit 5080 in which the fan 5040 is arranged. Thus, in operation of the dirty air system of FIG. 43, the motor 5030 drives a tool 5090 to move relative to the housing 5020 to work on a workpiece 5100, such that debris is generated. The motor 5030 also rotates the fan 5040, such that the fluid flow with the debris is pulled into the conduit 5080 via the fluid inlet 5050, as indicated by an arrow 5110. The fluid flow with debris is then moved by the fan 5040 through the fan 5040, out of the discharge outlet 5070, and into the opening 5060 of the filter 5000 as indicated by an arrow 5120. In this manner, the debris in the fluid flow is caught by the filter 5000 and stored in a collection chamber 5130 of the filter 5000. In some embodiments of the dirty air system of FIG. 43, the filter 5000 is "blown open" by the fan 5040. In some embodiments of the dirty air system of FIG. 43, the filter 5000 is removably attached to the power tool housing 5020, such that when the filter 5000 is full, it can be removed and replaced.

In the clean air system of FIG. 44, the filter 5000 is arranged within the conduit 5080 in between the fan 5040 and the fluid inlet 5050. Thus, in operation of the clean air system of FIG. 44, the motor 5030 drives the tool 5090 to move relative to the housing 5020 to work on the workpiece 5100, such that debris is generated. The motor 5030 also rotates the fan 5040, such that the fluid flow with the debris is pulled into the conduit 5080 via the fluid inlet 5050, as indicated by the arrow 5110. The fluid flow with debris is then moved by the fan 5040 through the opening 5060 of the filter 5000, as indicated by an arrow 5140, such that the debris in the fluid flow is caught by the filter 5000 and stored in the collection chamber 5130 of the filter 5000. With continued reference to arrow 5140, the fluid flow, now substantially free of debris, is pulled out of the filter 5000 by the fan 5040. The fluid flow is then exhausted by the fan 5040 out of the discharge outlet 5070, as indicated by an arrow 5150. In some embodiments of the dirty air system of FIG. 43, the filter 5000 is removably arranged in the conduit 5070, such that when the filter 5000 is full, it can be removed and replaced.

Various features of the invention are set forth in the following claims.

What is claimed is:

1. A power tool comprising:
a power tool housing, the power tool housing including a fluid inlet and a discharge outlet;
a motor;
a tool moved relative to the housing by the motor;
a fan rotated by the motor such that a fluid flow with debris generated by the tool is moved into the fluid inlet by the fan and through the discharge outlet; and
a filter that is removably attached to the power tool housing, the filter including
a filter media configured to separate the debris from the flow of fluid, the filter media defining a collection container configured to store the debris,
an opening through which the flow of fluid with the debris enters the collection container,
a valve that is moveable between a closed position, in which the opening is closed, and an open position, in which the opening is open, wherein the valve includes a duckbill check valve, and
a device configured to indicate when the filter is full, wherein the device includes a viewing window in the filter, and wherein the viewing window includes a clear bottom housing that rotates to become a side of the filter as the filter fills.

2. The power tool of claim 1, wherein when the filter is attached to the housing and the flow of fluid with debris is flowing to the discharge opening, the duckbill check valve is moved to the open position by the fluid flow with debris, and wherein when the filter is attached to the housing and the flow of fluid with debris is not flowing to the discharge opening, the duckbill check valve is moved to the closed position.

3. The power tool of claim 1, wherein the viewing window includes a see-through strip.

4. The power tool of claim 1, wherein the viewing window includes a translucent or transparent filter media.

5. The power tool of claim 1, wherein the device includes at least one of a pop-up indicator, mechanical limit switch, a Hall Effect sensor, a pressure sensor, or a force transducer that measures a force of the filter against a wall.

6. The power tool of claim 1, further comprising a power tool handle, wherein the device includes the power tool handle configured to provide haptic feedback to a user that the filter is full.

7. A power tool comprising:
a power tool housing, the power tool housing including a fluid inlet and a discharge outlet;
a motor;
a tool moved relative to the housing by the motor;
a fan rotated by the motor such that a fluid flow with debris generated by the tool is moved into the fluid inlet by the fan and through the discharge outlet; and
a filter that is removably attached to the power tool housing, the filter including
a filter media configured to separate the debris from the flow of fluid, the filter media defining a collection container configured to store the debris,
an opening through which the flow of fluid with the debris enters the collection container, and
a valve that is moveable between a closed position, in which the opening is closed, and an open position, in which the opening is open, wherein the valve includes a zipper, wherein when the filter is attached to the housing, the zipper is automatically moved to the open position, such that the opening of the filter is in fluid communication with the discharge outlet, and wherein when the filter is removed from the housing, the zipper is automatically moved to the closed position.

8. The power tool of claim 7, further comprising a device configured to indicate when the filter is full.

9. The power tool of claim 8, wherein the device includes a viewing window in the filter.

10. The power tool of claim 8, wherein the device includes at least one of a pop-up indicator, mechanical limit switch, a Hall Effect sensor, a pressure sensor, a force transducer that measures the force of the filter against a wall, or haptic feedback.

\* \* \* \* \*